United States Patent
Moon et al.

(10) Patent No.: US 12,380,225 B2
(45) Date of Patent: Aug. 5, 2025

(54) STORAGE DEVICE, HOST DEVICE AND DATA TRANSFER METHOD THEREOF

(71) Applicant: Samsung Electronics Co., Ltd., Suwon-si (KR)

(72) Inventors: Youngsik Moon, Suwon-si (KR); Jiyoup Kim, Seoul (KR); Hongrak Son, Anyang-si (KR); Dongmin Shin, Seoul (KR); Junho Shin, Suwon-si (KR); Jaehun Jang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 621 days.

(21) Appl. No.: 17/692,458

(22) Filed: Mar. 11, 2022

(65) Prior Publication Data

US 2023/0044214 A1 Feb. 9, 2023

(30) Foreign Application Priority Data

Aug. 4, 2021 (KR) ........................ 10-2021-0102583

(51) Int. Cl.
| | | |
|---|---|---|
| G06F 21/60 | (2013.01) | |
| G06F 13/16 | (2006.01) | |
| G06F 21/79 | (2013.01) | |
| H04L 9/00 | (2022.01) | |
| H04L 9/08 | (2006.01) | |

(52) U.S. Cl.
CPC ........ *G06F 21/602* (2013.01); *G06F 13/1673* (2013.01); *G06F 21/79* (2013.01); *H04L 9/008* (2013.01); *H04L 9/0825* (2013.01)

(58) Field of Classification Search
CPC .... G06F 21/602; G06F 13/1673; G06F 21/79; H04L 9/008; H04L 9/0825
See application file for complete search history.

(56) References Cited

U.S. PATENT DOCUMENTS

| | | |
|---|---|---|
| 7,679,133 B2 | 3/2010 | Son et al. |
| 8,553,466 B2 | 10/2013 | Han et al. |
| 8,559,235 B2 | 10/2013 | Yoon et al. |

(Continued)

FOREIGN PATENT DOCUMENTS

| | | | |
|---|---|---|---|
| JP | 2010-141618 A | 6/2010 | |
| JP | 2016-090884 A | 5/2016 | |

(Continued)

OTHER PUBLICATIONS

Kim, Bongjun, et al. "Compiler-Assisted Semantic-Aware Encryption for Efficient and Secure Serverless Computing." IEEE Internet of Things Journal, vol. 8, No. 7, pp. 5645-5656, Apr. 1, 2021.

(Continued)

*Primary Examiner* — Jung W Kim
*Assistant Examiner* — Alan L Kong
(74) *Attorney, Agent, or Firm* — MORGAN, LEWIS & BOCKIUS LLP

(57) ABSTRACT

A method of transmitting data in a storage device includes encrypting original data based on a homomorphic encryption algorithm to generate encrypted data, generating a parameter for regeneration of a ciphertext higher than an operation level of the encrypted data by using the encrypted data and a key value, and transmitting the encrypted data and the parameter to an external host device.

20 Claims, 18 Drawing Sheets

(56) References Cited

U.S. PATENT DOCUMENTS

| | | | |
|---|---|---|---|
| 8,654,587 | B2 | 2/2014 | Yoon et al. |
| 9,331,851 | B2 | 5/2016 | Youn et al. |
| 9,536,970 | B2 | 1/2017 | Seol et al. |
| 10,075,289 | B2* | 9/2018 | Laine ................ G09C 1/00 |
| 10,211,975 | B2 | 2/2019 | Loftus et al. |
| 2010/0211787 | A1* | 8/2010 | Bukshpun ............ H04L 9/14 380/255 |
| 2014/0177828 | A1* | 6/2014 | Loftus ............... H04L 9/0852 380/44 |
| 2014/0233727 | A1 | 8/2014 | Rohloff et al. |
| 2014/0310527 | A1* | 10/2014 | Veugen ............. H04L 9/0825 713/150 |
| 2016/0241389 | A1* | 8/2016 | Le Saint ............. H04L 9/14 |
| 2017/0147835 | A1* | 5/2017 | Bacon ................ H04L 9/321 |
| 2018/0375640 | A1* | 12/2018 | Laine ................ H04L 9/008 |
| 2019/0363872 | A1* | 11/2019 | Shim ................ H04L 9/0618 |
| 2019/0394019 | A1 | 12/2019 | Gao |
| 2021/0111864 | A1 | 4/2021 | Gentry et al. |
| 2021/0119766 | A1 | 4/2021 | Suresh et al. |
| 2021/0376996 | A1 | 12/2021 | Moon et al. |
| 2022/0094521 | A1 | 3/2022 | Moon et al. |
| 2023/0361985 | A1* | 11/2023 | Raheman ............ G06F 21/64 |
| 2023/0396409 | A1* | 12/2023 | Joye ................ G06N 3/048 |
| 2024/0022395 | A1* | 1/2024 | Hoshizuki ........... G06F 21/60 |

FOREIGN PATENT DOCUMENTS

| | | |
|---|---|---|
| KR | 101677114 B1 | 11/2016 |
| KR | 10-2018-0013064 A | 2/2018 |
| KR | 10-2040106 B1 | 11/2019 |
| KR | 10-2021-0147645 A | 12/2021 |
| KR | 10-2022-0040309 A | 3/2022 |

OTHER PUBLICATIONS

Chillotti, Ilaria, et al. "TFHE: fast fully homomorphic encryption over the torus." Journal of Cryptology 33.1, pp. 34-91, Apr. 25, 2019.

Mkhinini, Asma, et al. "HLS design of a hardware accelerator for homomorphic encryption." 2017 IEEE 20th International Symposium on Design and Diagnostics of Electronic Circuits & Systems (DDECS). IEEE, Apr. 21, 2017.

Extended European Search Report dated Oct. 5, 2022 for corresponding European Application No. 22168764.3.

I. Chillotti, et al. 'Faster Packed Homomorphic Operations and Efficient Circuit Bootstrapping for TFHE' *International Association for Cryptologic Research*, 2017, pp. 377-408.

Z. Brakerski, et al. '(Leveled) Fully Homomorphic Encryption without Bootstrapping' *ACM Transactions on Computation Theory*, vol. 6, No. 3, Article 13, 2014, pp. 13:1-13:36.

* cited by examiner

STORAGE DEVICE, HOST DEVICE AND DATA TRANSFER METHOD THEREOF

CROSS-REFERENCE TO RELATED APPLICATION(S)

This application claims the benefit under 35 USC 119(a) of Korean Patent Application No. 10-2021-0102583 filed on Aug. 4, 2021 in the Korean Intellectual Property Office, the entire disclosure of which is incorporated herein by reference for all purposes.

BACKGROUND

The present inventive concepts relate to a storage device, a host device and a data transfer method thereof.

In general, in homomorphic encryption, even when an operation is performed in the ciphertext state without decrypting the encrypted information, the same result as the encrypted value may be obtained after an operation on the plain text. The biggest problem in the commercialization of homomorphic encryption technology is the size of the ciphertext, which is tens of times larger than the original data.

SUMMARY

Example embodiments provide a storage device having a reduced data transfer amount and having a homomorphic encryption device, a host device, and a method of operating the same.

According to example embodiments, a method of transmitting data in a storage device includes encrypting original data based on a homomorphic encryption algorithm; generating a parameter for regeneration of a ciphertext higher than an operation level of the encrypted data by using the encrypted data and a key value; and transmitting the encrypted data and the parameter to an external host device.

According to example embodiments, a storage device includes at least one non-volatile memory device; and a controller controlling the at least one non-volatile memory device. The controller includes control pins providing control signals to the at least one non-volatile memory device; a security module performing a homomorphic encryption operation; a buffer memory temporarily storing data required for the homomorphic encryption operation; and at least one processor controlling an overall operation of the controller. The security module encrypts original data into a ciphertext of a first operation level based on a homomorphic encryption algorithm, and generates a parameter for regeneration of a ciphertext of a level higher than the first operation level. The ciphertext of the first operation level may be incapable of performing ciphertext operations multiple times.

According to example embodiments, a method of operating a host device includes receiving a ciphertext of a first operation level and a parameter from a storage device; regenerating respective ciphertexts of a plurality of levels using corresponding data among the ciphertext of the first operation level and the parameter; and performing an operation on a ciphertext using the regenerated ciphertexts.

According to example embodiments, a method of transmitting data of an electronic device includes generating a ciphertext to receive a cloud service; generating table data having a parameter for bootstrapping of the ciphertext, using the ciphertext and a key value; and transmitting the ciphertext and the table data to a cloud server.

According to example embodiments, a method of operating a cloud server includes receiving a first ciphertext, a second ciphertext and table data corresponding to a cloud service request from an electronic device; regenerating ciphertexts of one of a plurality of levels corresponding to the first ciphertext and the second ciphertext, using the table data; performing a ciphertext operation on the regenerated ciphertexts; and transmitting a result value of the ciphertext operation according to the cloud service request to the electronic device.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Hereinafter, example embodiments will be described with reference to the accompanying drawings.

Figure 1:
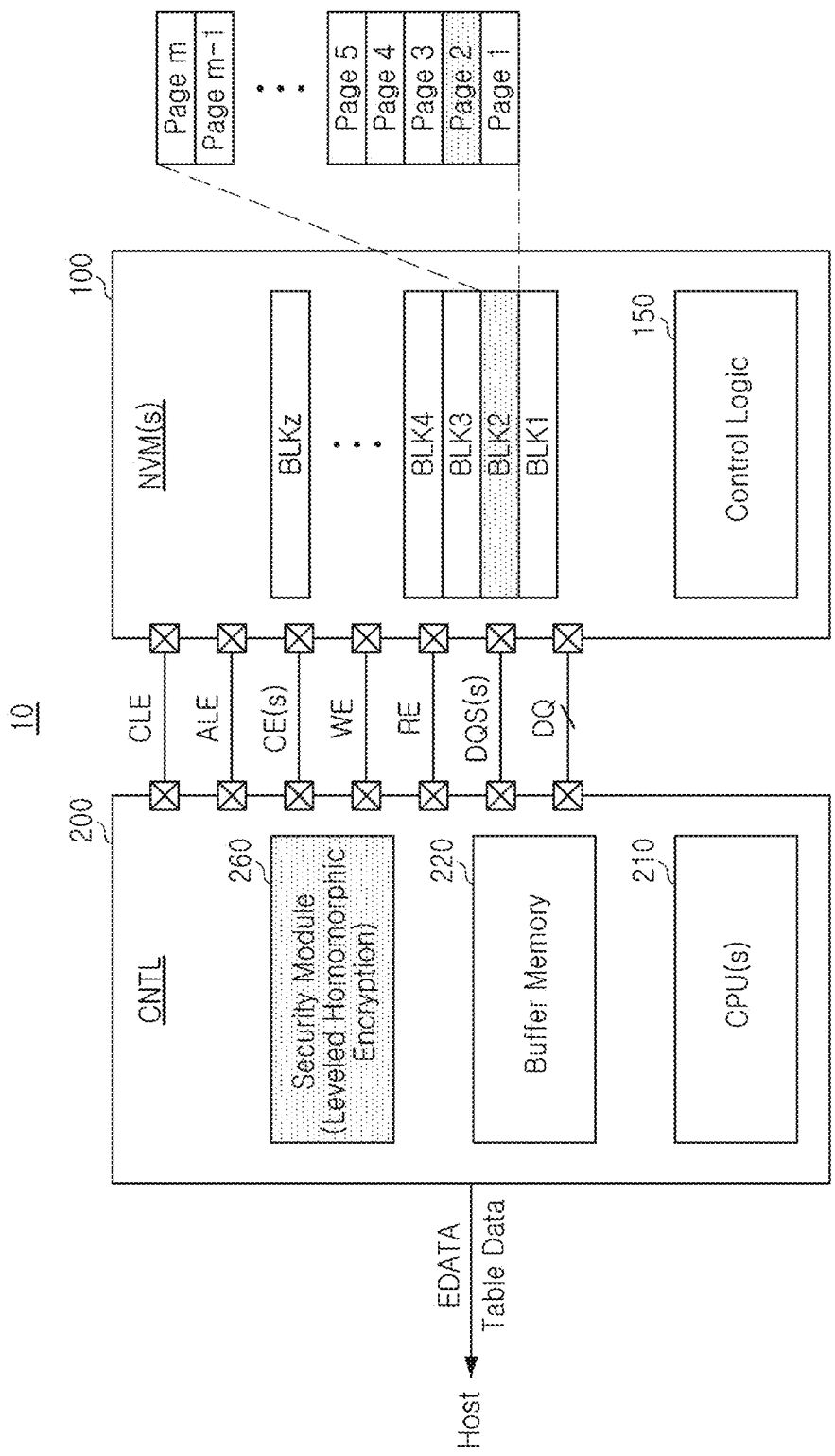
FIG. 1 is a diagram illustrating an example of a storage device 10 according to an example embodiment.

FIG. 1 is a diagram illustrating an example of a storage device 10 according to an example embodiment. Referring to FIG. 1, the storage device 10 may include at least one non-volatile memory device (NVM(s)) 100, and a controller (CNTL).

At least one non-volatile memory device 100 may be implemented to store data. Examples of the non-volatile memory device 100 may include a NAND flash memory, a vertical NAND flash memory, a NOR flash memory, a resistive random access memory (RRAM), a phase-change memory(PRAM), a magnetoresistive random access memory (MRAM), a ferroelectric random access memory (FRAM), a spin transfer torque random access memory (STT-RAM), and the like. Also, the non-volatile memory device 100 may be implemented as a three-dimensional array structure. The present inventive concepts are applicable not only to a flash memory device in which the charge storage layer is formed of a conductive floating gate, but also to a charge trap flash (CTF) in which the charge storage layer is formed of an insulating film. Hereinafter, for convenience of description, the non-volatile memory device 100 will be referred to as a vertical NAND flash memory device (VNAND).

Also, the non-volatile memory device 100 may be implemented to include a plurality of memory blocks BLK1 to BLKz (where z is an integer greater than or equal to 2), and a control logic 150. Each of the plurality of memory blocks BLK1 to BLKz may include a plurality of pages (Page 1 to Page m, where m is an integer greater than or equal to 2). Each of the plurality of pages Page 1 to Page m may include a plurality of memory cells. Each of the plurality of memory cells may store at least one bit.

The control logic 150 may receive a command and an address from a controller (CNTL) 200, and perform an operation (programming operation, read operation, erase operation, or the like) corresponding to the received command on memory cells corresponding to the address.

The controller (CNTL) 200 may be connected to the at least one non-volatile memory device 100 through a plurality of control pins transmitting control signals (e.g., CLE, ALE, CE(s), WE, RE, or the like), and in addition, may be implemented to control the non-volatile memory device 100 using control signals CLE, ALE, CE(s), WE, RE, or the like. For example, the non-volatile memory device 100 latches a command or an address at an edge of a write enable (WE)/read enable (RE) signal according to a command latch enable (CLE) signal and an address latch enable (ALE) signal, thereby performing programming operation/read operation/erase operation. For example, during a read operation, the chip enable signal CE may be activated, CLE may be activated in a command transmission section, ALE may be activated in an address transmission section, and RE may be toggled in a section in which data is transmitted through a data signal line DQ. A data strobe signal DQS may be toggled with a frequency corresponding to the data input/output speed. The read data may be sequentially transmitted in synchronization with the data strobe signal DQS.

In addition, the controller 200 may include at least one processor (Central Processing Unit (s)) 210, a buffer memory 220, and a security module 260.

The processor 210 may be implemented to control the overall operation of the storage device 10. The processor 210 may perform various management operations, such as cache/buffer management, firmware management, garbage collection management, wear leveling management, data deduplication management, read refresh/reclaim management, bad block management, multi-stream management, management of mapping of host data and a non-volatile memory, Quality of Service (QoS) management, system resource allocation management, non-volatile memory queue management, read level management, erase/program management, hot/cold data management, power loss protection management, dynamic thermal management, initialization management, Redundant Array of Inexpensive Disk (RAID) management, and the like.

The buffer memory 220 may be implemented as a volatile memory (e.g., static random access memory (SRAM), dynamic RAM (DRAM), synchronous RAM (SDRAM), or the like) or non-volatile memory (e.g., flash memory, phase-change RAM (PRAM), Magneto-resistive RAM (MRAM), resistive RAM (ReRAM), ferro-electric RAM (FRAM), or the like).

The security module 260 may be implemented to perform a security function of the storage device 10. For example, the security module 260 may perform a Self Encryption Disk (SED) function or a Trusted Computing Group (TCG) security function. The SED function may store encrypted data in the non-volatile memory device 100 or decrypt data encrypted from the non-volatile memory device 100, using an encryption algorithm. This encryption/decryption operation may be performed using an internally generated encryption key. In an example embodiment, the encryption algorithm may be an Advanced Encryption Standard (AES) encryption algorithm. On the other hand, it should be understood that the encryption algorithm is not limited thereto. The TCG security function may provide a mechanism to enable access control to user data of the storage device 10. For example, the TCG security function may perform an authentication procedure between the external device and the storage device 10. In an example embodiment, the SED function or the TCG security function is optionally selectable.

In addition, the security module 260 may generate a first operation level ciphertext (EDATA) based on a leveled homomorphic encryption algorithm, and may be implemented to generate table data having parameters for regeneration of ciphertexts of operation levels higher than a first operation level. In this case, the operation level refers to a security level, and as the operation level increases, the number of possible operations of the ciphertext may increase.

In general, when performing multiplication between ciphertexts in homomorphic encryption, the operation level of the ciphertext decreases by one. Bootstrapping (reboot) is a technique to increase the security level of ciphertext in homomorphic encryption. For example, bootstrapping is a technique for recovering the operation level consumed by ciphertext operation. The security module 260 may generate the first operation level ciphertext in a state in which no operation is performed, and table data for regeneration of the higher-level ciphertext, and may transmit the ciphertext having a first operation level and the table data to an external host device.

A storage device to which a general homomorphic encryption is applied generates a ciphertext of a highest level and transmits the generated ciphertext to a host device. However, the ciphertext of the highest level is relatively very large data compared to the ciphertext of the first operation level. Therefore, in the existing storage device, the amount of data transfer required for homomorphic encryption is considerable. Moreover, the amount of computation required to apply bootstrapping is considerable, and accordingly, a large amount of bootstrapping time is consumed.

Meanwhile, the storage device 10 according to an example embodiment of the present inventive concepts generates a first operation level ciphertext and corresponding table data to apply the homomorphic encryption operation and transmits the generated ciphertext and table data to the host device, thereby significantly reducing the transmission amount of data compared to that of the related art. In addition, by performing bootstrapping with a simple operation using the first operation level ciphertext and the table data, the bootstrapping time may be significantly reduced.

Figure 2:
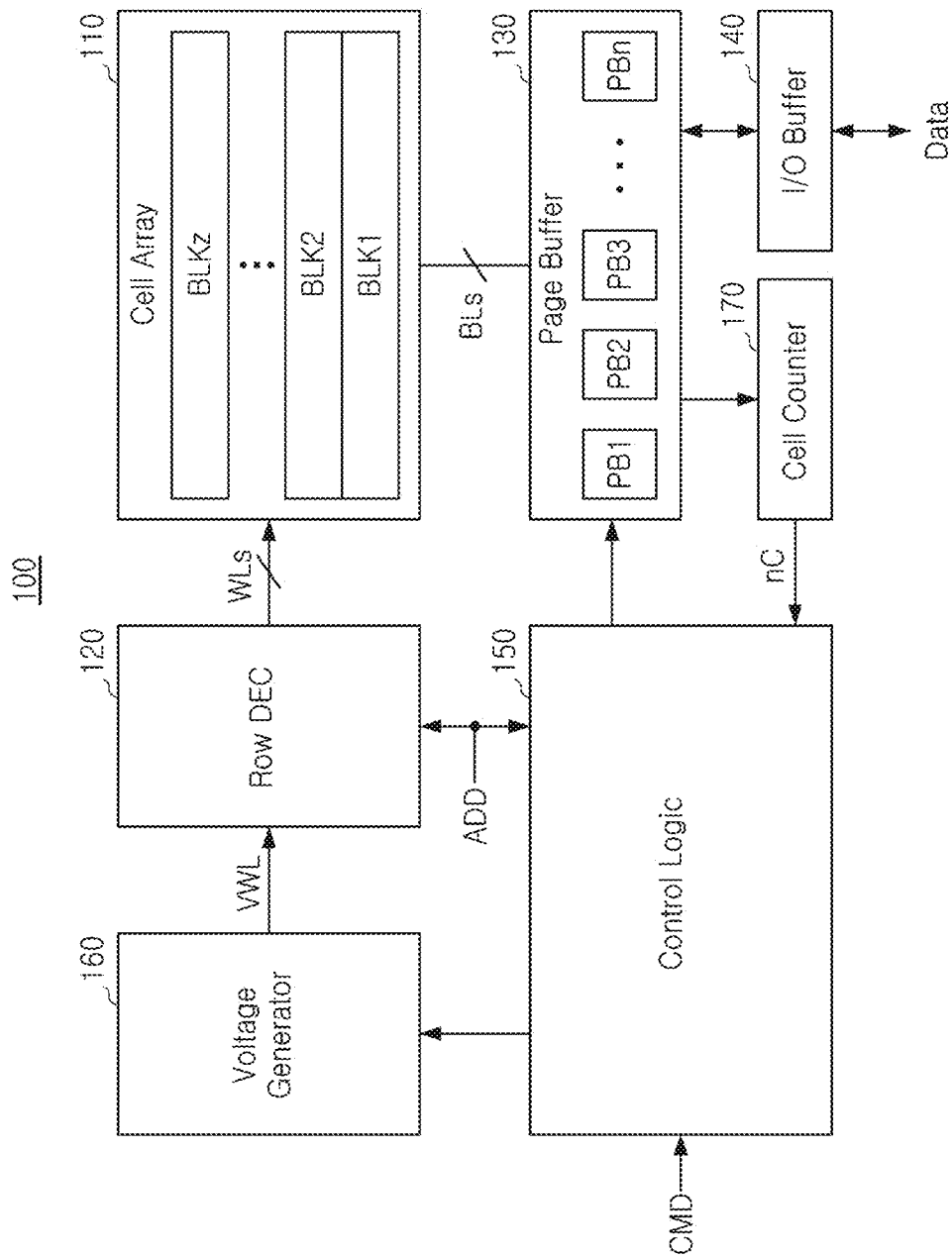
FIG. 2 is a diagram illustrating an example of a non-volatile memory device 100 illustrated in FIG. 1.

FIG. 2 is a diagram illustrating an example of the non-volatile memory device 100 illustrated in FIG. 1. Referring to FIG. 2, the non-volatile memory device 100 may include a memory cell array 110, a row decoder 120, a page buffer circuit 130, an input/output buffer circuit 140, a control logic 150, a voltage generator 160, and a cell counter 170.

The memory cell array 110 may be connected to the row decoder 120 through word lines WLs or selection lines SSL and GSL. The memory cell array 110 may be connected to the page buffer circuit 130 through bit lines BLs. The memory cell array 110 may include a plurality of cell strings. Each channel of the cell strings may be formed in a vertical or horizontal direction. Each of the cell strings may include a plurality of memory cells. In this case, the plurality of memory cells may be programmed, erased, or read by a voltage applied to the bit line BLs or the word line WLs. In general, a programming operation is performed in units of pages, and an erase operation is performed in units of blocks. Details of memory cells will be described in U.S. Pat. Nos. 7,679,133, 8,553,466, 8,654,587, 8,559,235, and U.S. Pat. No. 9,536,970. In an example embodiment, the memory cell array 330 may include a two-dimensional memory cell array, and the two-dimensional memory cell array may include a plurality of NAND strings disposed in a row direction and a column direction.

The row decoder 120 may be implemented to select one of the memory blocks BLK1 to BLKz of the memory cell array 110 in response to an address ADD. The row decoder 120 may select one of the word lines of the selected memory block in response to the address ADD. The row decoder 120 may transfer a word line voltage VWL corresponding to an operation mode to the word line of the selected memory block. During a programming operation, the row decoder 120 may apply a program voltage and a verify voltage to a selected word line and may apply a pass voltage to an unselected word line. During a read operation, the row decoder 120 may apply a read voltage to a selected word line and may apply a read pass voltage to an unselected word line.

The page buffer circuit 130 may be implemented to operate as a write driver or a sense amplifier. During a programming operation, the page buffer circuit 130 may apply a bit line voltage corresponding to data to be programmed to the bit lines of the memory cell array 110. During a read operation or a verify read operation, the page buffer circuit 130 may sense data stored in the selected memory cell through the bit line BL. Each of the plurality of page buffers PB1 to PBn (where n is an integer greater than or equal to 2) included in the page buffer circuit 130 may be connected to at least one bit line.

Each of the plurality of page buffers PB1 to PBn may be implemented to perform sensing and latching for performing an OVS operation. For example, each of the plurality of page buffers PB1 to PBn may perform a plurality of sensing operations to identify any one state stored in the memory cells selected under the control of the control logic 150. Also, each of the plurality of page buffers PB1 to PBn may store data sensed through a plurality of sensing operations and may select any one data under the control of the control logic 150. For example, each of the plurality of page buffers PB1 to PBn may perform sensing a plurality of times to identify any one state. In addition, each of the plurality of page buffers PB1 to PBn may select or output optimal data from among a plurality of data sensed according to the control of the control logic 150.

The input/output buffer circuit 140 provides externally-provided data to the page buffer circuit 130. The input/output buffer circuit 140 may provide the externally provided command CMD to the control logic 150. The input/output buffer circuit 140 may provide the externally provided address ADD to the control logic 150 or the row decoder 120. In addition, the input/output buffer circuit 140 may output data sensed and latched by the page buffer circuit 130 externally.

The control logic 150 may be implemented to control the row decoder 120 and the page buffer circuit 130 in response to the command CMD transmitted from an external source, for example, the controller 200 (see FIG. 1).

The voltage generator 160 may be implemented to generate various types of word line voltages to be applied to the respective word lines under the control of the control logic 150 and well voltages to be supplied to a bulk (e.g., well region) in which memory cells are formed. The word line voltages applied to the respective word lines may include a program voltage, a pass voltage, a read voltage, read pass voltages, and the like.

The cell counter 170 may be implemented to count memory cells corresponding to a specific threshold voltage range, from data sensed by the page buffer circuit 130. For example, the cell counter 170 may count the number of memory cells having a threshold voltage in a specific threshold voltage range by processing data sensed in each of the plurality of page buffers PB1 to PBn.

Figure 3:
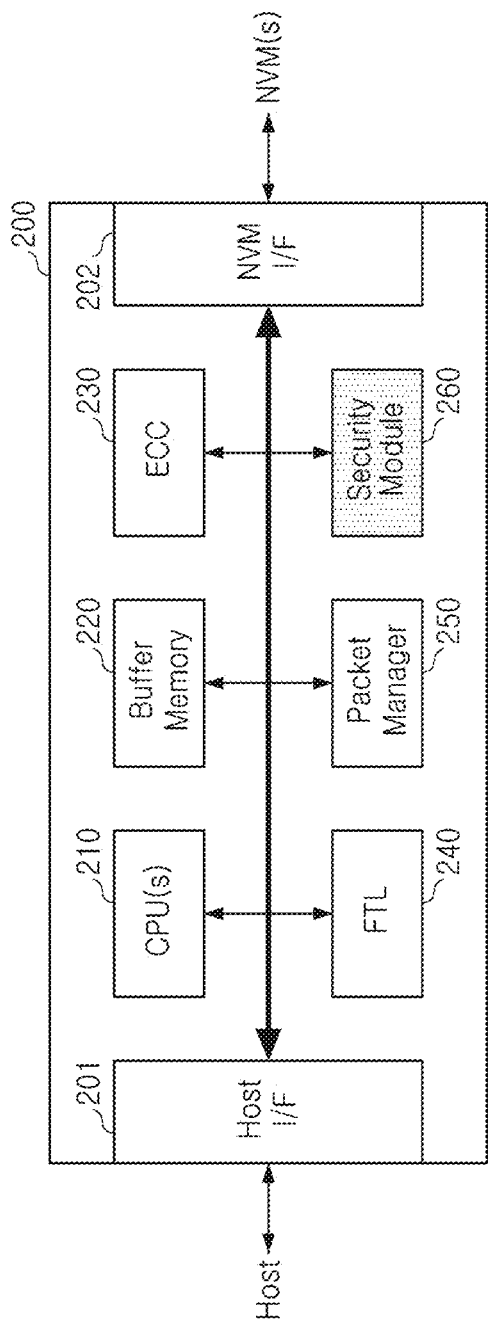
FIG. 3 is a diagram illustrating an example of a controller 200 according to an example embodiment.

FIG. 3 is a diagram illustrating an example of a controller 200 according to an example embodiment. Referring to FIG. 3, the controller 200 may include a host interface 201, a memory interface 202, at least one CPU 210, a buffer memory 220, an error correction circuit 230, a flash translation layer manager 240, a packet manager 250, and a security module 260.

The host interface 201 may be implemented to transmit and receive packets to and from the host. A packet transmitted from the host to the host interface 201 may include a command, or data to be written to the non-volatile memory device 100. A packet transmitted from the host interface 201 to the host may include a response to a command, or data read from the non-volatile memory device 100. The memory interface 202 may transmit data to be written to the non-volatile memory device 100, to the non-volatile memory device 100, or may receive data read from the non-volatile memory device 100. The memory interface 202 may be implemented to comply with a standard protocol such as JDEC Toggle or Open NAND Flash Interface (ONFI).

The buffer memory 220 may temporarily store data to be written to the non-volatile memory device 100 or data read from the non-volatile memory device 100. In an example embodiment, the buffer memory 220 may be a configuration provided in the controller 200. In another embodiment, the buffer memory 220 may be disposed outside of the controller 200. In another example, the buffer memory 220 may temporarily sore data required for the homomorphic encryption operation.

The ECC circuit 230 may be implemented to generate an error correction code during a programming operation and recover data using the error correction code during a read operation. For example, the ECC circuit 230 may generate an error correction code (ECC) for correcting a fail bit or an error bit of data received from the non-volatile memory device 100. The ECC circuit 230 may form DATA to which a parity bit is added by performing error correction encoding of data provided to the non-volatile memory device 100. The parity bit may be stored in the non-volatile memory device 100. Also, the ECC circuit 230 may perform error correction decoding on the DATA output from the non-volatile memory device 100. The ECC circuit 230 may correct an error using parity. The ECC circuit 230 may correct an error, using coded modulation, such as Low Density Parity Check (LDPC) code, BCH code, Turbo code, Reed-Solomon code, Convolution code, Recursive Systematic Code (RSC), Trellis-Coded Modulation (TCM), Block Coded Modulation (BCM), or the like. On the other hand, when error correction is impossible in the error correction circuit 230, a read retry operation may be performed.

The flash translation layer manager 240 may perform various functions such as address mapping, wear-leveling, and garbage collection. The address mapping operation is an operation of changing a logical address received from the host into a physical address used to actually store data in the non-volatile memory device 100. The wear-leveling is a technique for preventing excessive degradation of a specific block by ensuring that blocks in the non-volatile memory device 100 are used uniformly. For example, the wear-leveling may be implemented by a firmware technique for balancing erase counts of physical blocks. The garbage collection is a technique for securing usable capacity in the non-volatile memory device 100 in a method of erasing an existing block after copying valid data of a block into a new block.

The packet manager 250 may generate a packet according to a protocol of an interface negotiated with the host, or may parse various information from a packet that is received from the host.

The security module 260 may perform at least one of a homomorphic encryption operation and a decryption operation on data input to the CPU 210, using a symmetric-key algorithm. The security module 260 may include an encryption module and a decryption module. In an example embodiment, the security module 260 may be implemented in hardware/software/firmware. In addition, the security module 260 may be implemented to perform an authentication operation with an external device or to perform a fully homomorphic encryption function.

Figure 4:
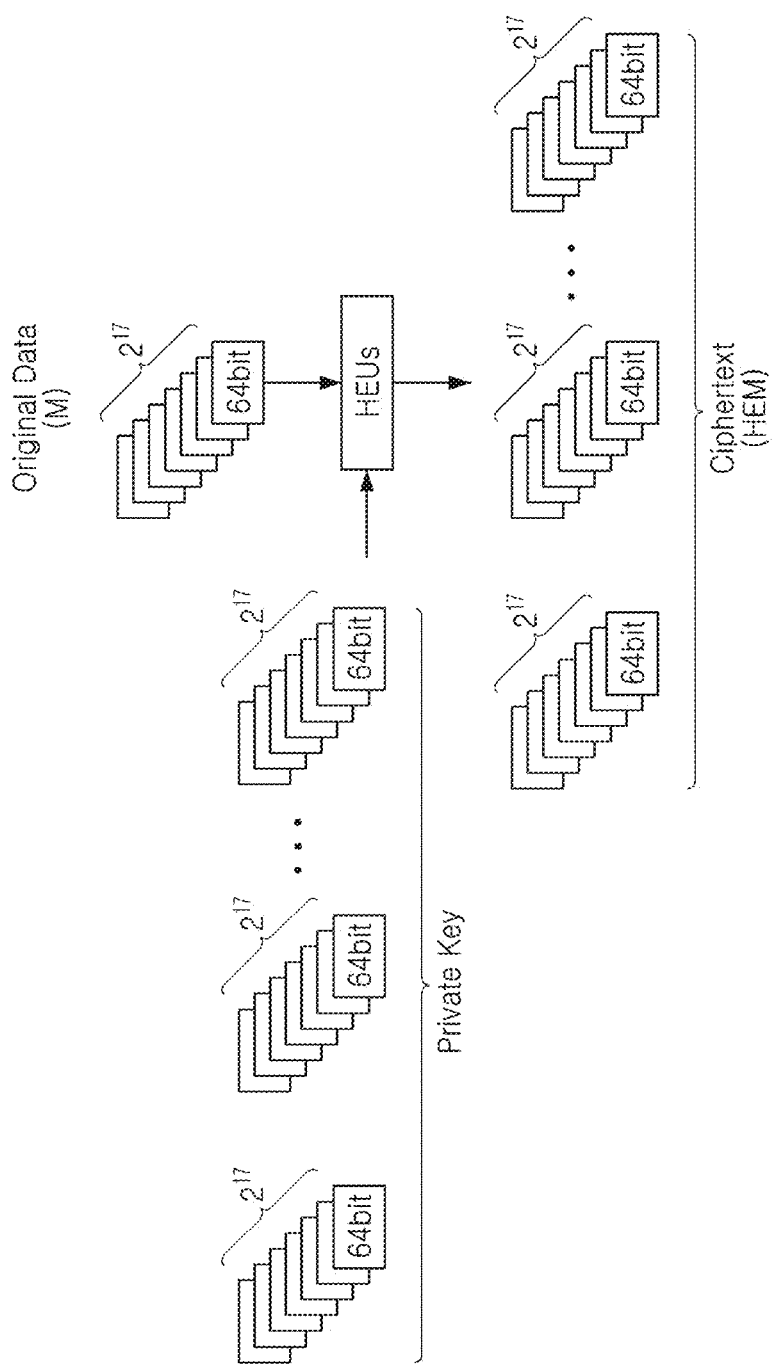
FIG. 4 is a diagram illustrating a general homomorphic encryption process.

FIG. 4 is a diagram illustrating a general homomorphic encryption process. In general, homomorphic encryption is an encryption system in which the size of the output ciphertext increases by several tens of times, compared to the input original data, differently from the existing encryption technology. As illustrated in FIG. 4, in the homomorphic encryption, compared with the original data, the ciphertext increases by about L times to perform the multiplication operation L times (where L is an integer greater than or equal to 2) in the encrypted state. In the homomorphic encryption, the operation level is defined as follows. In the first-level ciphertext, multiplication of the additional ciphertext by two or more times is impossible, while decryption is possible. In L-level ciphertext, multiplication of ciphertext is possible L-1 times. These technical characteristics are inherent theoretical characteristics of homomorphic encryption technology. Therefore, in the homomorphic encryption data transfer method of the related art, it is necessary to significantly increase the data transfer amount when transmitting and receiving ciphertext in order to increase the number of possible calculations.

Figure 5:
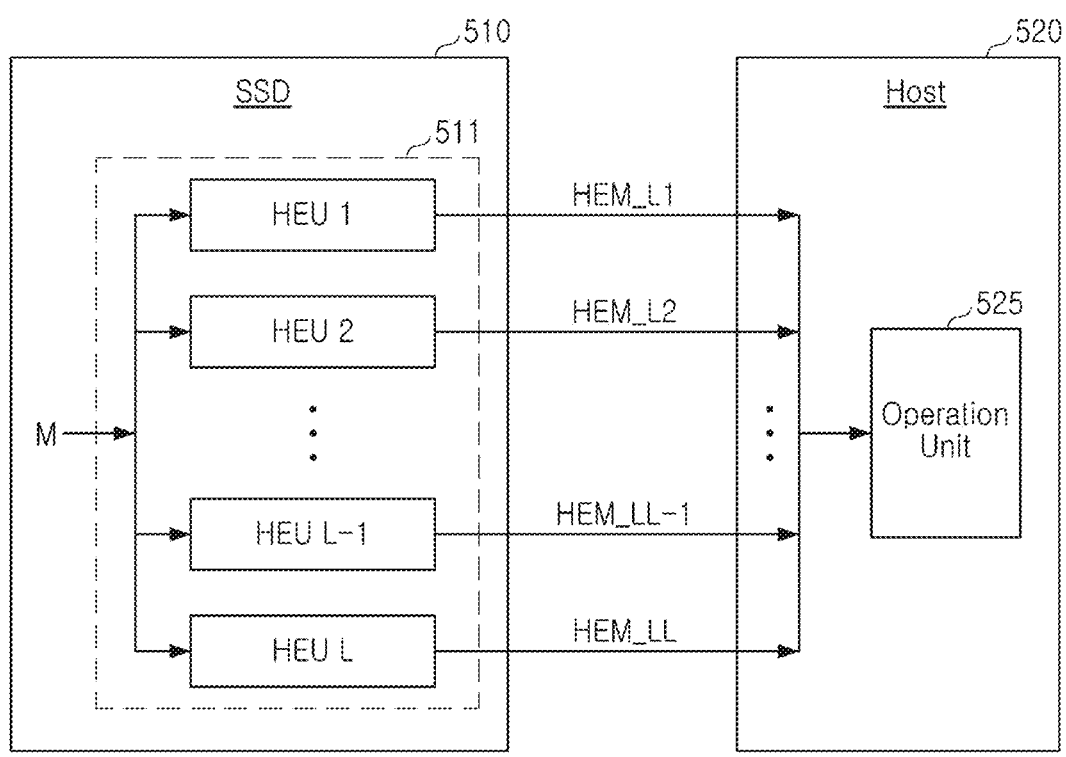
FIG. 5 is a view illustrating a ciphertext transmission method according to a homomorphic encryption device of a general storage device (SSD) 510.

FIG. 5 is a view illustrating a ciphertext transmission method according to the homomorphic encryption device of a general storage device (SSD) 510. Referring to FIG. 5, the storage device (SSD) 510 includes a homomorphic encryption device 511. The homomorphic encryption device 511 includes a plurality of homomorphic encryption units HEU 1 to HEU L. Each of the plurality of homomorphic encryption units HEU 1 to HEU L may receive an original message M and generate ciphertexts HEM_L1 to HEM_LL of the corresponding level.

An operation unit 525 of a host device 520 may receive ciphertexts HEM_L1 to HEM_LL of a plurality of levels from the storage device SSD and calculate the received ciphertexts HEM_L1 to HEM_LL.

In the homomorphic encrypted data transfer method according to an example embodiment of the present inventive concepts, a ciphertext having a relatively small size may be transmitted while performing L operations.

Figure 6:
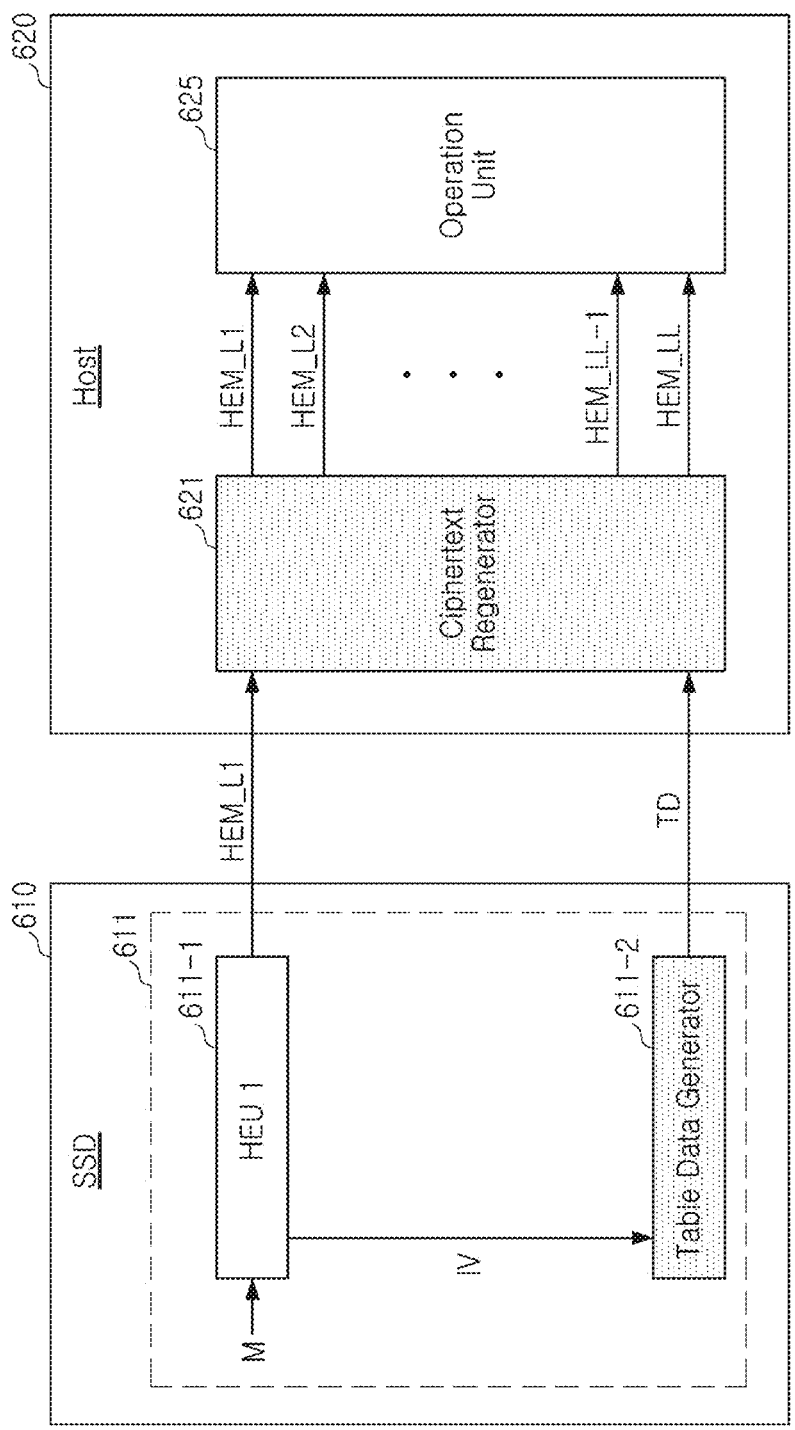
FIG. 6 is a diagram illustrating a method of transmitting homomorphic encrypted data of a storage device 610 according to an example embodiment.

FIG. 6 is a diagram illustrating a method of transmitting homomorphic encrypted data of a storage device 610 according to an example embodiment of the present inventive concepts.

Referring to FIG. 6, the storage device 610 may include a homomorphic encryption device 611. The homomorphic encryption device 611 may include a homomorphic encryption unit 611-1 and a table data generator 611-2. The homomorphic encryption unit 611-1 may be implemented to receive original data M and to generate a first-level ciphertext HEM_L1. The table data generator 611-2 may be implemented to receive an initial value IV of the homomorphic encryption unit 611-1 and to generate table data TD for regeneration of the homomorphic ciphertext. In an example embodiment, the initial value IV may be generated by a multiplication operation of a public key and a secret key (or private key) of the storage device 610. Thus, the initial value IV may be data of the multiplication operation. In this case, the number of public keys of the storage device 610 may correspond to the number of ciphertext levels corresponding to the number of possible ciphertext operations.

The generation of the table data TD may be performed in the same process as the homomorphic encryption process when m=$a_0$S. Accordingly, the information for regeneration of the ciphertext may be homomorphically encrypted and transmitted. As a result, the security level of the table data TD has the same level as that of the homomorphic encryption of the original system. The storage device 610 may transmit the ciphertext HEM_L1 of the first level and the table data TD to a host device 620.

Referring back to FIG. 6, the host device 620 may include a ciphertext regenerator 621 and an operation unit 625. The ciphertext regenerator 621 may be implemented to receive the first level ciphertext (HEM_L1) and the table data (TD) from the storage device 610, and to generate ciphertexts of a plurality of levels (HEM_L1, HEM_L2, . . . , HEM_LL-1, and HEM_LL). The operation unit 625 may be implemented to receive the ciphertexts of the plurality of levels HEM_L1, HEM_L2, . . . , HEM_LL-1 and HEM_LL and to perform a ciphertext operation.

Figure 7A:
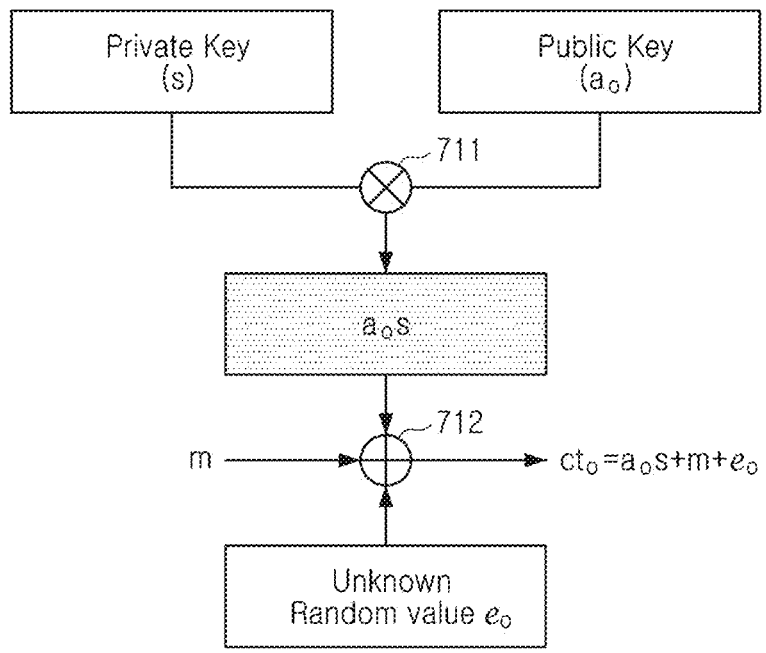
FIG. 7A is a diagram illustrating a homomorphic encryption unit 710 according to an example embodiment.
Figure 7B:
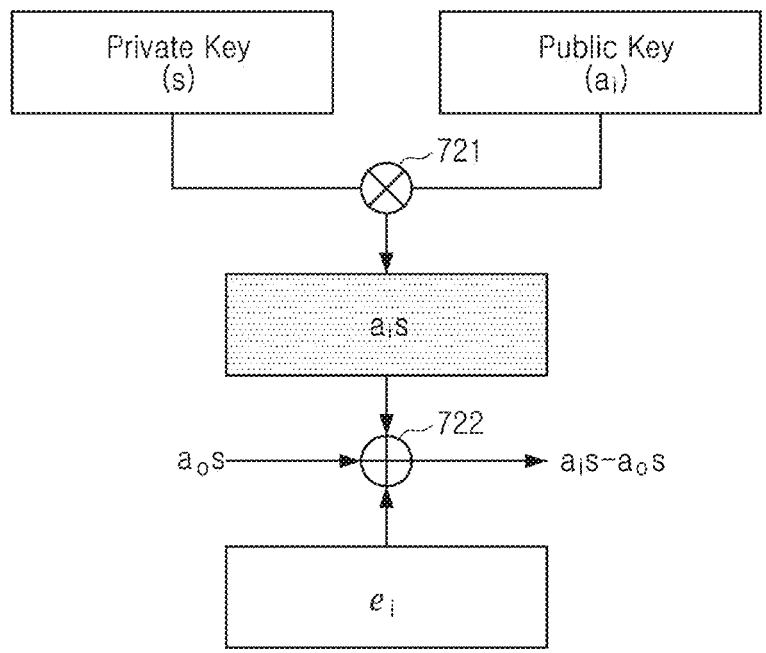
FIG. 7B is a diagram illustrating a table data generator 720 according to an example embodiment.

FIG. 7A is a diagram illustrating a homomorphic encryption unit 710 according to an example embodiment, and FIG. 7B is a diagram illustrating a table data generator 720 according to an example embodiment.

Referring to FIG. 7A, the homomorphic encryption unit 710 may include a multiplier 711 and an adder 712. The multiplier 711 may perform a multiplication operation on the private key (s) and the public key ($a_0$) The adder 712 may perform an addition operation on a multiplied value $a_0s$ of the multiplier 711, a message m, and a random value $e_0$. The adder 712 may output the first level ciphertext($ct_0=a_0s+m+e_0$, HEM_L1 illustrated in FIG. 6).

Referring to FIG. 7B, the table data generator 720 may include a multiplier 721 and a subtractor 722. The multiplier 721 may perform a multiplication operation on a private key (s) and a public key ($a_i$). The subtractor 722 may perform a subtraction operation on the multiplication value $a_0s$ of the multiplier 711 of the homomorphic encryption unit 710 from a multiplication value $a_is$ of the multiplier 721. The subtractor 722 may output a parameter for regeneration of ciphertext, for example, table data (($a_is-a_0s$,TD illustrated in FIG. 6). Assuming that the data processing unit is 64 bits in the case of the homomorphic encryption parameter, the following equation may be satisfied.

Message: $m < 62$ bit

Public Rev: $a_i < 62$ bit key: $s < 62$ bit

Unknown Random value: $e_i$-discrete Gaussian distribution. $(0, \sigma)$

Prime: $62$ bit $< q_L < q_{L-1} < \ldots < q_0 < 64$ bit

Ciphertext 0: $a_0s+m+e_0 < q_L < q_{L-1} < \ldots < q_0$      [Equation 1]

where m is the message, $a_i$ is the public key of the ith security level, s is the private key, $e_i$ is a random value according to a discrete Gaussian distribution, prime is the modulus of each security level, and $a_0s+m+e_o$ is the first level ciphertext.

Hereinafter, the process of generating the ciphertext of successive messages (a, b) will be described. One ciphertext for the first message (a) may be generated as illustrated in the following equation.

$$ct_0 = a_0s + m_a + e_0 \bmod q_0 \quad \text{[Equation 2]}$$

One ciphertext for the second message (b) may be generated as illustrated in the following equation.

$$ct_0 = a_0s + m_b + e_0 \bmod q_0 \quad \text{[Equation 3]}$$

Table data for regeneration of one ciphertext into L+1 ciphertexts may be generated as illustrated in the following equation.

$$r_1 = a_0s - a_1s + e_1 \bmod q_1 \quad \text{[Equation 4]}$$
$$r_2 = a_0s - a_2s + e_2 \bmod q_2$$
$$\vdots$$
$$r_L = a_0s - a_Ls + e_L \bmod q_L$$

Table data may be set only once as long as the public key/private key is not changed.

Figure 8:
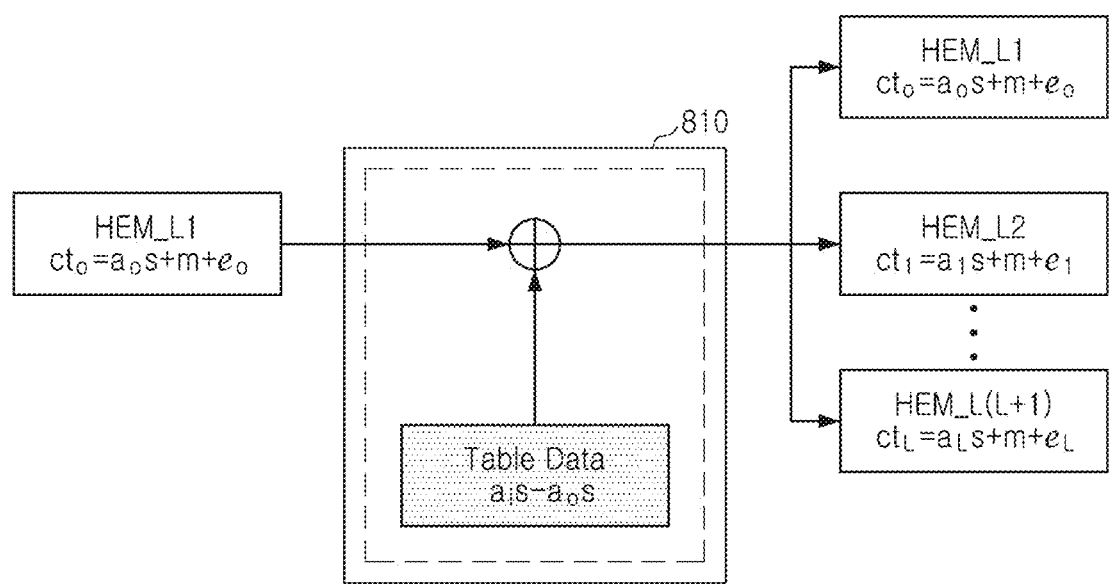
FIG. 8 is a diagram illustrating an example of a ciphertext regenerator 810 according to an example embodiment.

FIG. 8 is a diagram illustrating an example of a ciphertext regenerator 810 according to an example embodiment.

Referring to FIG. 8, the ciphertext regenerator 810 may receive a first level ciphertext ($ct_0=a_0s+m+e_0$, HEM_L1 illustrated in FIG.6) and table data ($a_is-a_0s$, TD illustrated in FIG. 6) from the storage device and may generate ciphertexts HEM_L1 to HEM_LL of a plurality of levels.

The ciphertext regeneration using table data is as follows. In this case, even when the $e_i$ is changed, decoding is possible. The regenerated ciphertext of the first message (a) may satisfy the following equation.

$$ct_i = ct_0 - r_i = a_is + m_a + e_0 - e_i \bmod q_i = a_is + m_a + e'_i \bmod q_i \quad \text{[Equation 5]}$$

The regenerated ciphertext of the second message (b) may satisfy the following equation.

$$ct_i = ct_0 - r_i = a_is + m_b + e_0 - e_i \bmod q_i = a_is + m_b + e'_i \bmod q_i \quad \text{[Equation 6]}$$

Finally, when the ciphertext of the first message (a) is received, the ciphertext regenerator 810 may generate L+1 ciphertexts according to the following equation.

$$ct_0 = a_0s + m_a + e_0 \bmod q_0 \quad \text{[Equation 7]}$$
$$ct_1 = a_1s + m_a + e_1 \bmod q_1$$
$$\vdots$$
$$ct_L = a_Ls + m_a + e_L \bmod q_L$$

Thereafter, when the ciphertext of the second message (b) is received, the ciphertext regenerator 810 may generate L+1 ciphertexts according to the following equation.

$$ct_0 = a_0s + m_b + e_0 \bmod q_0 \quad \text{[Equation 8]}$$
$$ct_1 = a_1s + m_b + e_1 \bmod q_1$$
$$\vdots$$
$$ct_L = a_Ls + m_b + e_L \bmod q_L$$

On the other hand, the homomorphic encrypted data transfer method described in FIGS. 7A to 8 is applied to the CKKS ciphertext structure. It should be understood that the present inventive concepts are not limited thereto. The homomorphic encrypted data transfer method of the present inventive concepts is applicable to the BGV ciphertext structure.

Figure 9A:
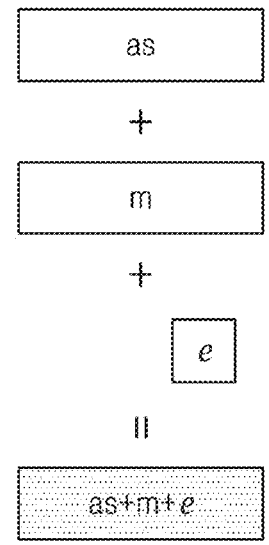
FIG. 9A is a diagram illustrating a structure of a CKKS ciphertext.
Figure 9B:
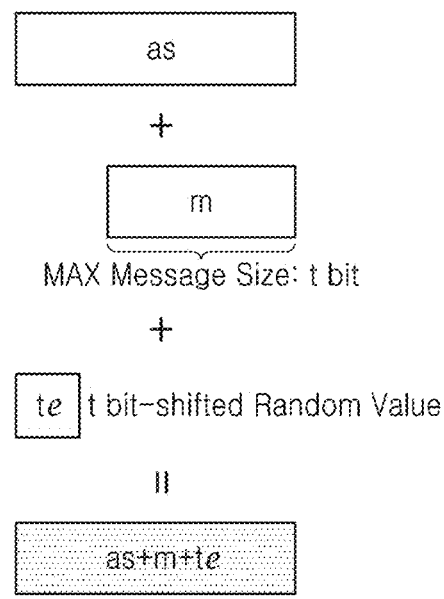
FIG. 9B is a diagram illustrating a structure of a BGV ciphertext.

FIG. 9A is a diagram illustrating the structure of a CKKS ciphertext, and FIG. 9B is a diagram illustrating the structure of a BGV ciphertext.

Referring to FIG. 9A, a CKKS ciphertext (as+m+e) may be generated by adding a multiplication value (as) of a private key (s) and a public key, a message (m), and a random value (e).

Referring to FIG. 9B, a BGV ciphertext (as+m+te) may be generated by adding a multiplication value (as) of a private key (s) and a public key, a message (m), and a random value (te). In this case, the size of the maximum message (m) is t bits. The random value te is a random value shifted by t bits.

Figure 10:
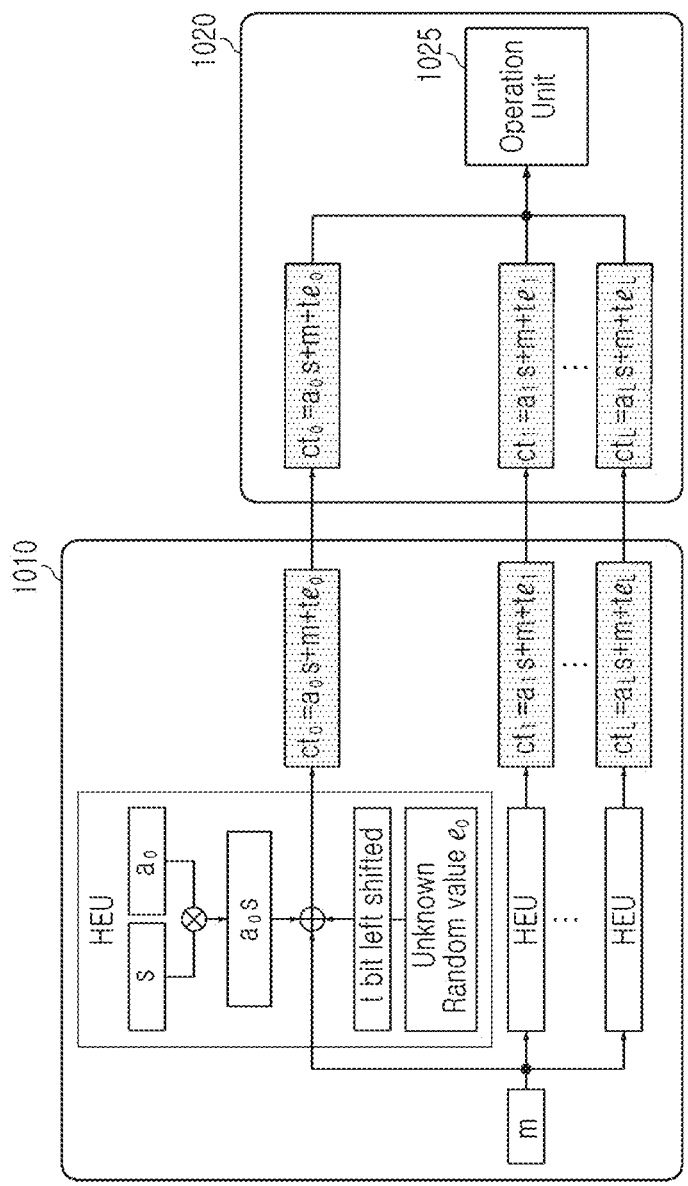
FIG. 10 is a diagram illustrating a general transmission method of BGV homomorphic encrypted data.

FIG. 10 is a diagram illustrating a general BGV homomorphic encrypted data transfer method. Referring to FIG. 10, a storage device 1010 has homomorphic encryption units (HEUs) that generate ciphertexts (ct0, ct1, ..., ctL) of a plurality of levels. Each of the ciphertexts (ct0, ct1, ..., ctL) has a t-bit shifted random value (te) different from the random value (e) of the CKKS ciphertext.

Referring back to FIG. 10, a server 1020 includes an operation unit 1025 that receives/computes the plurality of levels of ciphertexts ct0, ct1, . . . , and ctL.

Figure 11:
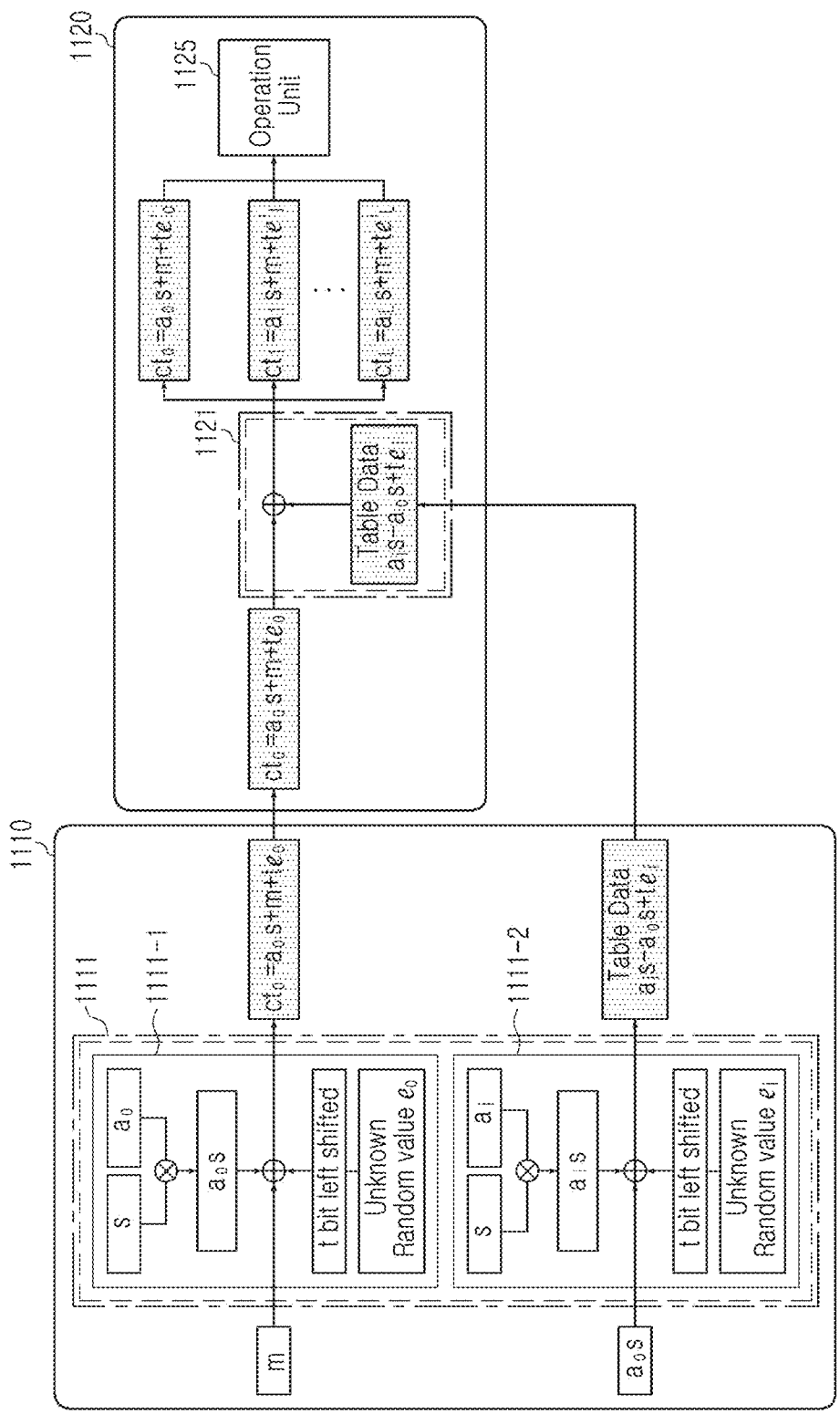
FIG. 11 is a diagram illustrating a method of transmitting homomorphic encrypted data in a storage device according to another example embodiment.

FIG. 11 is a diagram illustrating a method of transmitting homomorphic encrypted data in a storage device according to another example embodiment. Referring to FIG. 11, a storage device 1100 may include a homomorphic encryption device 1111. The homomorphic encryption device 1111 may include a homomorphic encryption unit 1111-1 and a table data generator 1111-2.

The homomorphic encryption unit 1111-1 may receive the message m and generate a ciphertext ($ct_0=a_0s+m+te_0$). The table data generator 1111-2 may generate table data ($a_is-a_0s+te_i$) for ciphertext regeneration. In this case, the table data ($a_is-a_0s+te_i$) may be a value obtained by adding a t-bit shifted random value ($te_i$) to the table data ($a_is-a_0s$) of the CKKS ciphertext.

Referring back to FIG. 11, the server 1120 may include a ciphertext regenerator 1121 and an operation unit 1125. The ciphertext regenerator 1121 may receive the ciphertext ($ct_0=a_0s+m+te_0$) and table data ($a_is-a_0s+te_i$) for ciphertext regeneration, and may generate ciphertexts of a plurality of levels ($ct_0=t_0s+m+te'_0$, $ct_1=t_1s++te'_1$, . . . , $ct_L=t_Ls+m+te'_L$). The operation unit 1125 may perform an operation on the ciphertexts of a plurality of levels ($ct_0=t_0s+m+te'_0$, $ct_1=t_1s+m+te'_1$, . . . , $ct_L=t_Ls+m+te'_L$).

Figure 12:
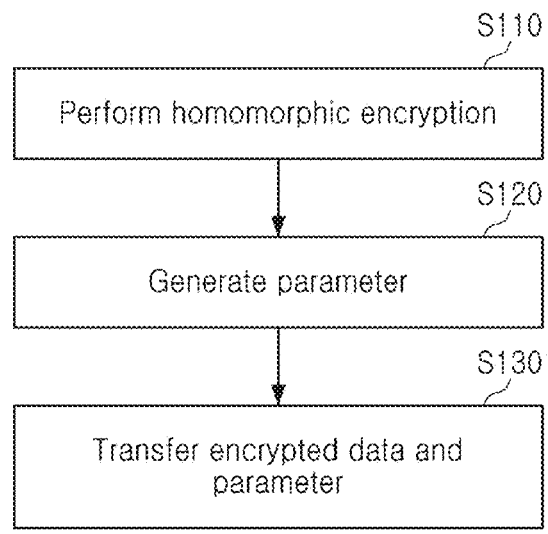
FIG. 12 is a flowchart illustrating an example of an operation of transmitting homomorphic encrypted data of a storage device according to an example embodiment.

FIG. 12 is a flowchart illustrating an example of an operation of transmitting homomorphic encrypted data of a storage device according to an example embodiment. Referring to FIG. 12, the operation of transmitting homomorphic encrypted data of the storage device may proceed as follows. The message M may be encrypted based on a homomorphic encryption algorithm (S110). In this case, the encrypted data may be a first level ciphertext HEM_L1. A parameter for ciphertext regeneration may be generated using the initial value (S120). In this case, the initial value may be a multiplication value of the private key (s) and the public key (a0). The storage device may transmit parameters and encrypted data for a ciphertext operation to the server (S130).

Figure 13:
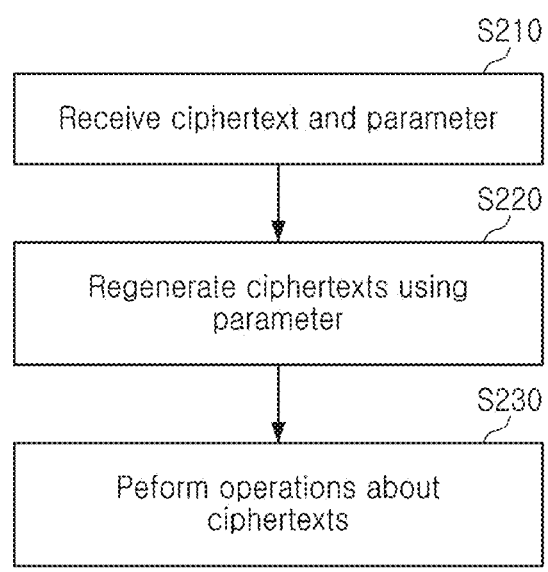
FIG. 13 is a flowchart illustrating an example of a method of operating a host device according to an example embodiment.

FIG. 13 is a flowchart illustrating an example of a method of operating a host device according to an example embodiment. Referring to FIG. 13, the operation of the host device may proceed as follows. The host device may receive the ciphertext and parameters (S210). By using the ciphertext and parameters, ciphertexts of a plurality of levels according to the homomorphic encryption may be regenerated (S220). A ciphertext operation using ciphertexts of a plurality of levels may be performed (S230).

In an example embodiment, one of a plurality of levels may be selected based on the parameter. In an example embodiment, a ciphertext corresponding to the selected level may be generated. In an example embodiment, the parameter may be received after being homomorphically encrypted at the same level as the security level of the ciphertext. In an example embodiment, the calculated value may be transmitted to the storage device.

Figure 14A:
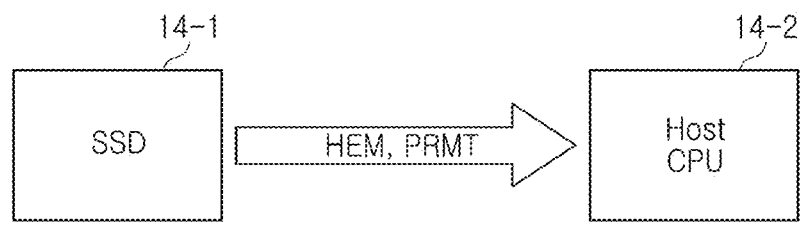
FIGS. 14A and 14B are diagrams illustrating example embodiments to which a homomorphic encrypted data transfer method of the present inventive concepts are applied, as an example.
Figure 14B:
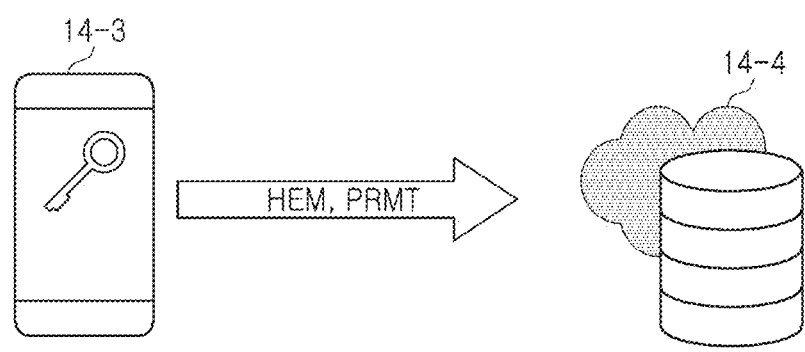

FIGS. 14A and 14B are diagrams illustrating example embodiments to which the homomorphic encrypted data transfer method of the present inventive concepts is applied as examples. As illustrated in FIG. 14A, a storage device (SSD) 14-1 may transmit the homomorphic encrypted data (HEM) and parameters (PRMT) described with reference to FIGS. 1 to 13 to a host CPU 14-2. The host CPU 14-2 may generate ciphertexts of a plurality of levels by using the homomorphic encrypted data HEM and the parameter PRMT, and may perform an operation on the generated ciphertexts.

As illustrated in FIG. 14B, a mobile device 14-3 may transmit homomorphic encrypted data (HEM) of the first operation level and a parameter (PRMT) for ciphertext regeneration to a cloud server 14-4 corresponding to the cloud service request. The cloud server 14-4 may generate ciphertexts of a plurality of levels by using the homomorphic encrypted data (HEM) and the parameter (PRMT), and may perform an operation on the generated ciphertexts. Also, the cloud server 14-4 may provide the result value of the ciphertext operation to a mobile device 14-3 as a service according to the cloud service request.

In 2-party communication, the mobile device 14-3 may encrypt sensitive data x1, x2, . . . , and xi and the required operation (or function) f with the private key, and may transmit the encryption results to the cloud server 14-4. The cloud server 14-4 may calculate c* with respect to the user's required service, using an encrypted algorithm (circuit). The cloud server 14-4 may then transmit c* to the mobile device 14-3. The mobile device 14-3 may obtain a result f(x1, x2, . . . , xi) of a required service by performing decryption using the private key. The cloud server 14-4 does not know what the user's data and the required operation are, but may only perform the operation requested by the user.

Figure 15:
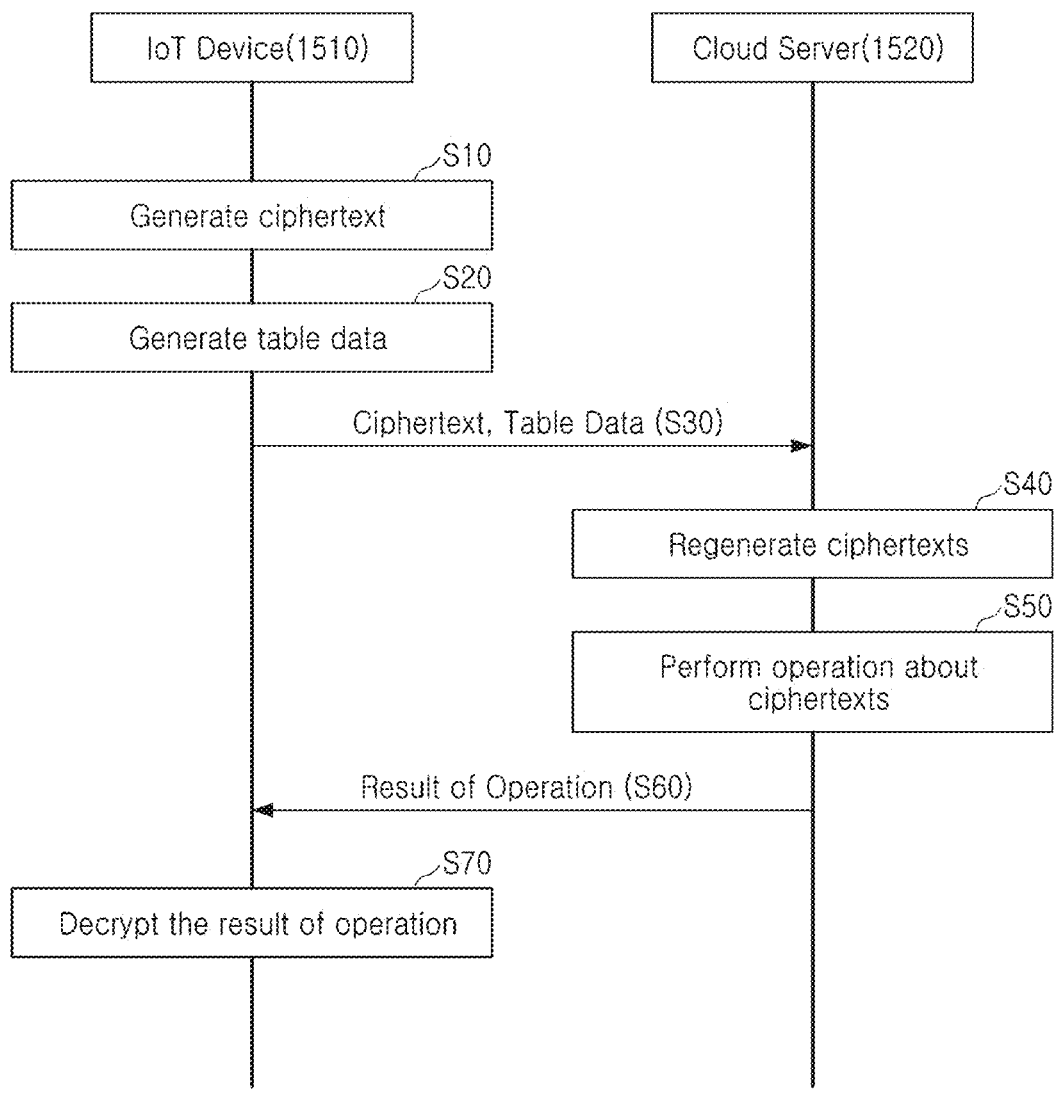
FIG. 15 is a ladder diagram illustrating an example of a data transfer method in a cloud system according to an example embodiment.

FIG. 15 is a ladder diagram illustrating an example of a data transfer method in a cloud system according to an example embodiment. Referring to FIG. 15, the data transfer method of the cloud system may proceed as follows.

An IoT device 1510 may generate a ciphertext for personal information required to receive the cloud service (S10). In this case, the ciphertext may be generated based on a homomorphic encryption algorithm. In detail, the ciphertext may be a first level ciphertext. The IoT device 1510 may generate parameters for regeneration of ciphertexts of the remaining levels. In this case, the parameter may be generated using a private key and a public key of the IoT device 1510 (S20). The IoT device 1510 may transmit a ciphertext and table data having parameters to the cloud server 1520 to receive a cloud service (S30).

The cloud server 1520 may receive the ciphertext and the table data, and regenerate ciphertexts of a plurality of levels (S40). The cloud server 1520 may perform an operation on ciphertexts for providing a cloud service (S50). The cloud server 1520 may transmit the ciphertext operation result corresponding to the cloud service to the IoT device 1510 (S60).

Thereafter, the IoT device 1510 may receive the ciphertext operation result value from the cloud server 1520 and decrypt the received operation result value using the private key (S70). Accordingly, the IoT device 1510 may receive a secure cloud service from the cloud server 1520.

On the other hand, the present inventive concepts are applicable to an electronic device having a storage device.

Figure 16:
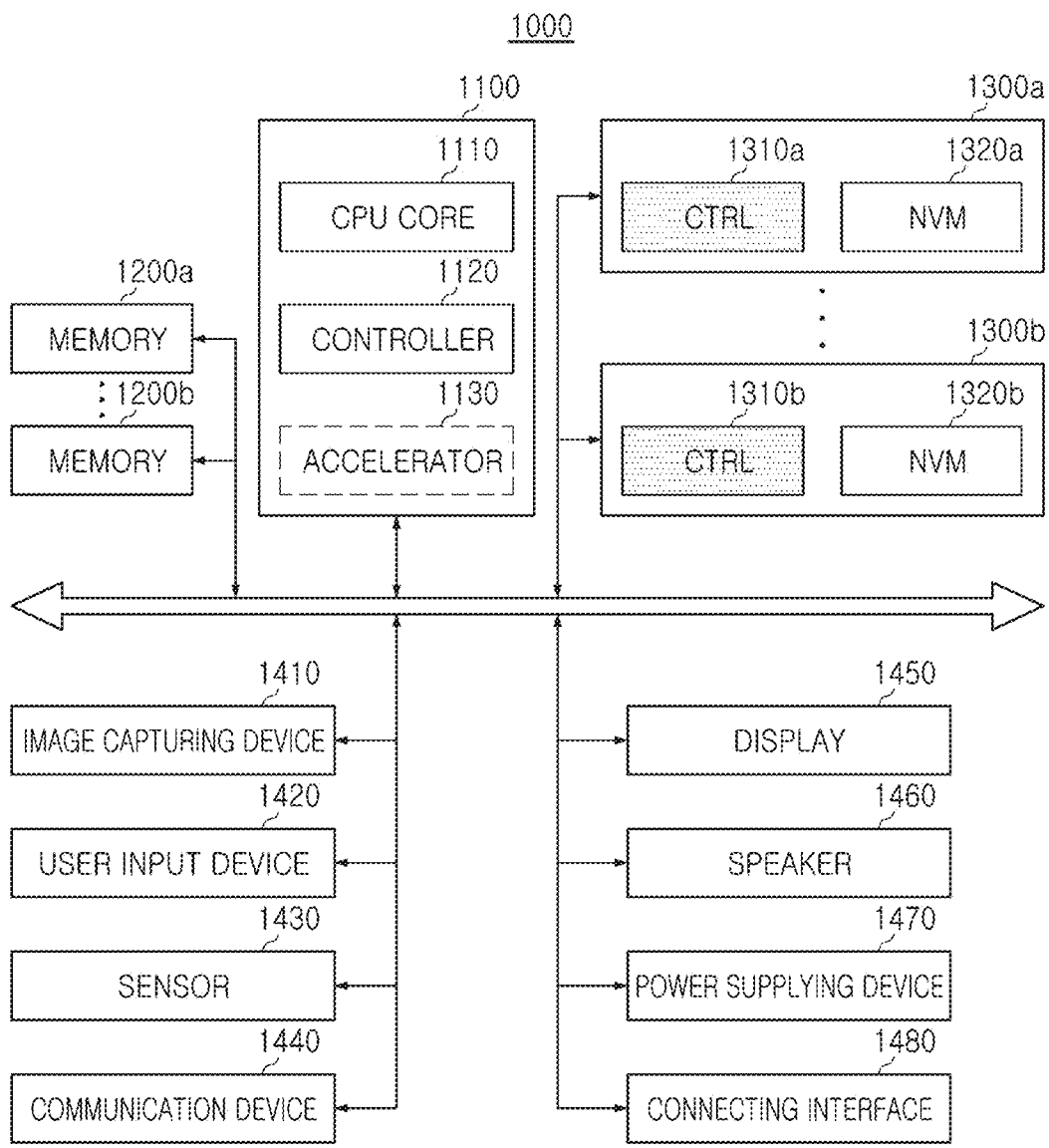
FIG. 16 is a diagram illustrating an example of an electronic device 1000 to which a storage device according to an example embodiment is applied.

FIG. 16 is a diagram illustrating an electronic device 1000 to which a storage device according to an example embodiment of the present inventive concepts is applied. The electronic device 1000 illustrated in FIG. 16 may basically be a mobile system, such as a mobile phone, a smart phone, a tablet personal computer (PC), a wearable device, a health care device, or an Internet of Things (IoT) device. However, the electronic device 1000 of FIG. 1 is not necessarily limited to a mobile system, and may be a personal computer, a laptop computer, a server, a media player, or an automotive device such as a navigation device.

Referring to FIG. 16, the electronic device 1000 may include one or more of a main processor 1100, memories 1200a and 1200b, and storage devices 1300a and 1300b. In addition, the electronic device 1000 may further include an image capturing device 1410, a user input device 1420, a sensor 1430, a communication device 1440, a display 1450, and a speaker 1460, a power supplying device 1470, and a connecting interface 1480.

The main processor 1100 may control the overall operation of the electronic device 1000, in detail, the operations of other components constituting the electronic device 1000. The main processor 1100 may be implemented as a general-purpose processor, a dedicated processor, an application processor, or the like.

The main processor 1100 may include one or more CPU cores 1110. Also, the main processor 1100 may further include a controller 1120 for controlling the memories 1200a and 1200b or the storage devices 1300a and 1300b. In an example embodiment, the main processor 1100 may further include an accelerator 1130 that is a dedicated circuit for high-speed data operation such as artificial intelligence (AI) data operation. The accelerator 1130 may include a graphics processing unit (GPU), a neural processing unit (NPU), or a data processing unit (DPU), and on the other hand, may also be implemented as a separate chip physically independent from other components of the main processor 1100.

The memories 1200a and 1200b may be used as main memory devices of the electronic device 1000. The memories 1200a and 1200b may include volatile memories such as SRAM or DRAM, but may also include nonvolatile memories such as flash memory, PRAM or RRAM. The memories 1200a and 1200b may also be implemented in the same package as that of the main processor 1100.

The storage devices 1300a and 1300b may be implemented as non-volatile storage devices that store data regardless of whether power is supplied or not. The storage devices 1300a and 1300b may have a relatively large storage capacity compared to the memories 1200a and 1200b. The storage devices 1300a and 1300b may include memory controllers 1310a and 1310b, and non-volatile memories (NVM) 1320a and 1320b for storing data under the control of the memory controllers 1310a and 1310b. The nonvolatile memories 1320a and 1320b may include a flash memory having a 2-dimensional (2D) structure or a 3-dimensional (3D) Vertical NAND (V-NAND) structure, but may include other types of non-volatile memory such as PRAM or RRAM.

In addition, the storage devices 1300a and 1300b may be implemented to generate ciphertexts and parameters according to a homomorphic encrypted data transfer method as described with reference to FIGS. 1 to 15.

The storage devices 1300a and 1300b may be included in the electronic device 1000 in a state physically separated from the main processor 1100. Also, the storage devices 1300a and 1300b may also be implemented in the same package as the main processor 1100. In addition, the storage devices 1300a and 1300b have the same form as a solid state device (SSD) or a memory card, and thus, may be coupled to other components of the electronic device 1000, to be detachable therefrom, through an interface such as the connecting interface 1480. These storage devices 1300a and 1300b may be devices to which standard protocols such as Universal Flash Storage (UFS), embedded multi-media card (eMMC), or non-volatile memory express (NVMe) are applied, but the configuration is not necessarily limited thereto.

The image capturing device 1410 may capture a still image or a moving image. The image capturing device 1410 may be a camera, a camcorder, a webcam, or the like.

The user input device 1420 may receive various types of data input from the user of the electronic device 1000, and may be a touch pad, a keypad, a keyboard, a mouse, a microphone, or the like.

The sensor 1430 may detect various types of physical quantities that may be obtained from the outside of the electronic device 1000, and may convert the sensed physical quantities into electrical signals. The sensor 1430 may be a temperature sensor, a pressure sensor, an luminance sensor, a position sensor, an acceleration sensor, a biosensor, a gyroscope sensor, or the like.

The communication device 1440 may transmit and receive wired/wireless signals with other devices outside of the electronic device 1000 according to various communication protocols. The communication device 1440 may be implemented to include an antenna, a transceiver, or a modem.

The display 1450 and the speaker 1460 may function as output devices that respectively output visual information and auditory information to the user of the electronic device 1000.

The power supplying device 1470 may appropriately convert power supplied from a battery embedded in the electronic device 1000 or an external power source and may supply the power to respective components of the electronic device 1000.

The connecting interface 1480 may provide a connection between the electronic device 1000 and an external device that is connected to the electronic device 1000 and may exchange data with a system, for example, the electronic device 1000. The connecting interface 1480 may be implemented in various interface methods, such as an Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVMe, IEEE 1394, universal serial bus (USB), secure digital (SD) card, multimedia card (MMC), eMMC, UFS, embedded Universal Flash Storage (eUFS), compact flash (CF) card interface, or the like.

On the other hand, in FIG. 16, a series of operations for transmitting the homomorphic encrypted data are performed by the memory controllers 1310a and 1310b. However, it should be understood that the present inventive concepts are not limited thereto. The electronic device according to an example embodiment of the present inventive concepts may include a security module that independently performs a series of operations for transmitting homomorphic encrypted data.

On the other hand, the present inventive concepts are applicable to IoT devices.

Figure 17:
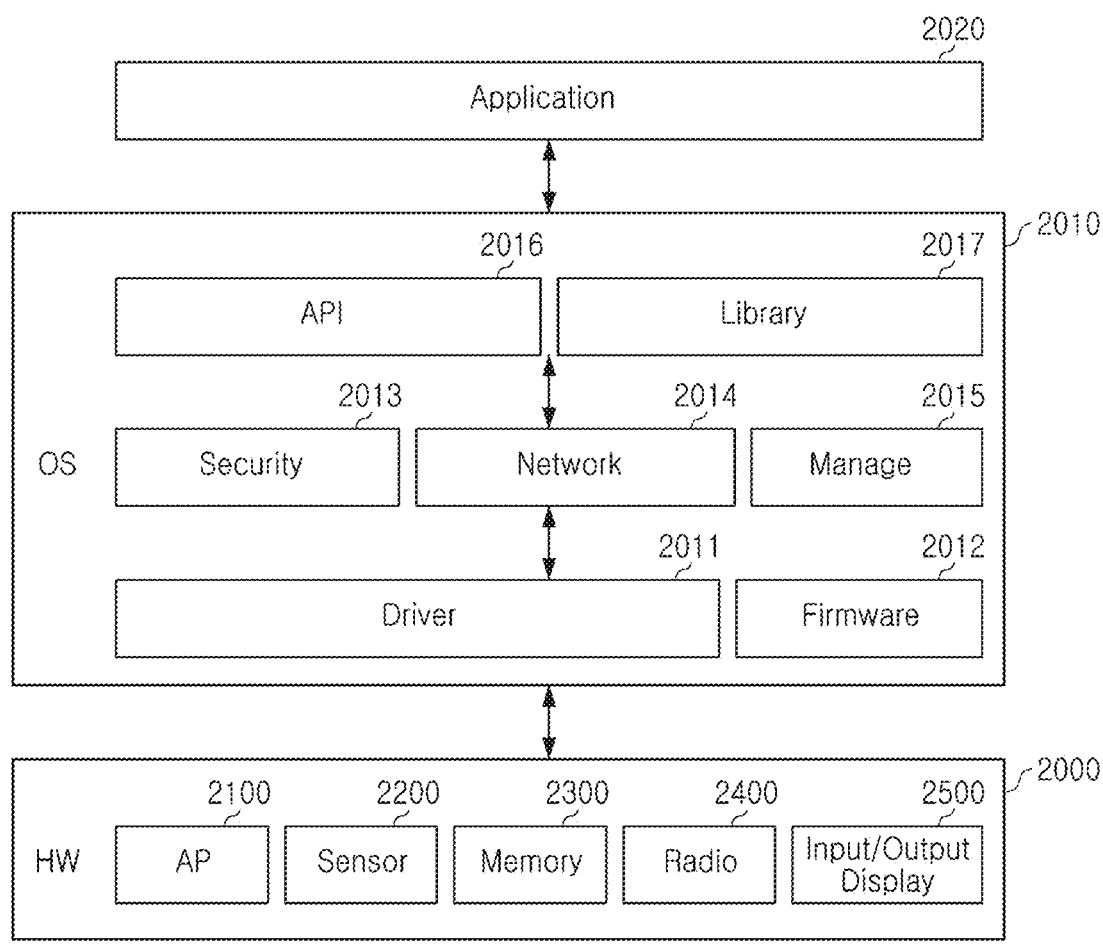
FIG. 17 is a conceptual diagram illustrating a hardware (HW) and software (SW) structure of an IoT device according to an example embodiment.

FIG. 17 is a conceptual diagram illustrating a hardware (HW) and software (SW) structure of an IoT device according to an example embodiment. Referring to FIG. 17, an IoT hardware 2000 may include an AP 2100, a sensor unit 2200, a memory 2300, a communication interface 2400, and an input/output device 2500.

The IoT device may further include an OS or an application 2020. The application 2020 refers to software (SW) and a service implementing a specific function. A user means an object using the application 2020. A user may communicate with the application 2020 through a user interface (UI). The application 2020 may be produced based on each service usage and communicate with the user through a user interface suitable for each usage. The application 2020 may perform an operation requested by the user, and if necessary, may call the contents of an Application Protocol Interface (API) 2016 and a library 2017.

The API 2016 or the library 2017 may perform a macro operation responsible for a specific function, or provide an interface when communication with a lower layer in a hierarchy of layers is required. When the application 2020 requests an operation from the lower layer through the API 2016 or the library 2017, the API 2016 or the library 2017 may classify the received requests into security 2013, network 2014 and management 2015 fields. The API 2016 or the library 2017 operates the required layer according to the requested field. For example, when the API 2016 requests a network(2014)-related function, the API 2016 may transmit a parameter required for the network 2014 layer and call the related function. In this case, the network 2014 may communicate with a lower layer to perform the requested operation. In a case in which there is no corresponding lower layer in a layer hierarchy, the API 2016 or the library 2017 may directly perform the corresponding operation.

A driver 2011 may serve to manage the IoT hardware 2000 and check the status thereof, and to receive the classified requests from higher layers and deliver the received requests to the IoT hardware 2000 layer.

When the driver 2011 requests an operation from the IoT hardware 2000 layer, a firmware 2012 may convert the request to be accepted by the IoT hardware 2000 layer. The firmware 2012 that converts the request and transmits the converted request to the IoT hardware 2000 may be implemented to be included in the driver 2011 or included in the IoT hardware 2000.

The IoT device may include the API 2016, the driver 2011, and the firmware 2012, and may have an Operating System (OS) 2010 therein, managing the entirety thereof. The OS 2010 may be stored in the memory 2300 in the form of control command codes and data. On the other hand, in the case of a low-cost IoT device having a relatively simple function, since the memory size is small, the control software 2010 rather than the OS may be included.

The IoT hardware 2000 performs the request (or command) delivered by the driver 2011 and the firmware 2012 in-order or out-of-order, and the results performed by the IoT hardware 2000 may be stored in the internal register of the IoT hardware 2000 or the memory 2300 connected to the IoT hardware 2000. The stored result may be returned to the driver 2011 and the firmware 2012.

The IoT hardware 2000 may generate an interrupt to request an operation necessary for a higher layer. When an interrupt occurs, the IoT hardware 2000 checks the corresponding interrupt in the management 2015 part of the OS 2010 and then communicates with the core part of the IoT hardware 2000 to process the corresponding interrupt.

Figure 18:
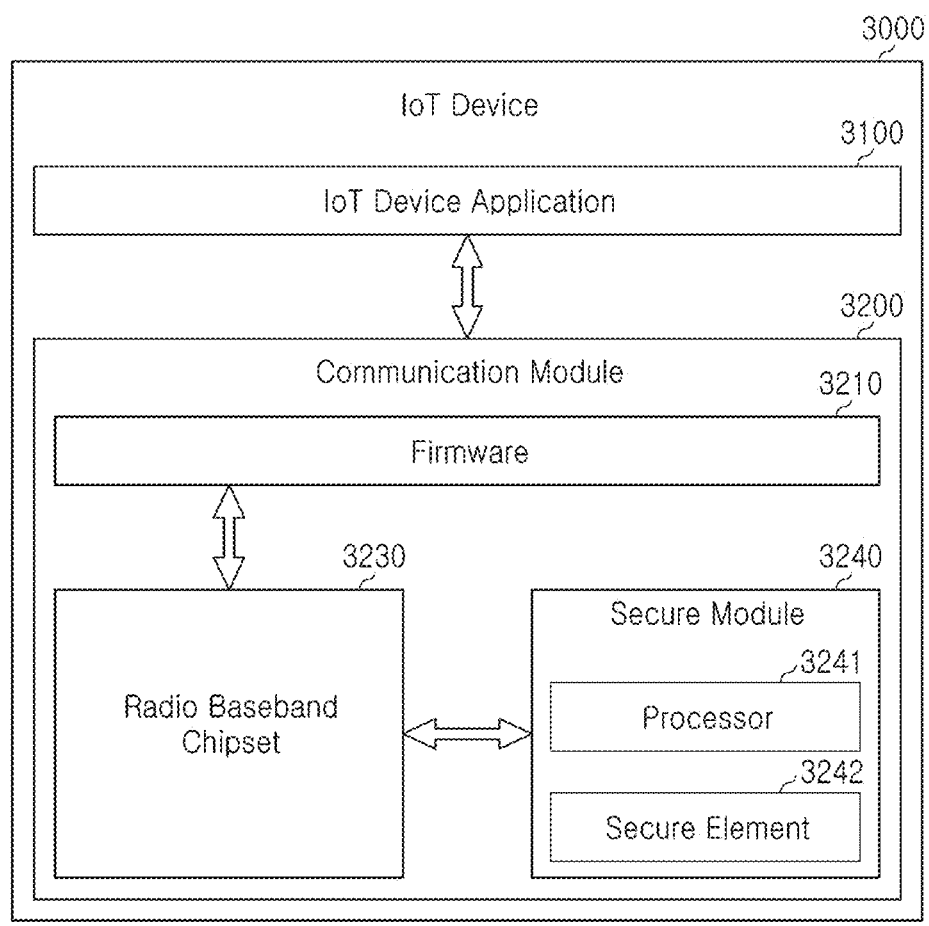
FIG. 18 is a diagram illustrating an IoT device 3000 according to an example embodiment.

FIG. 18 is a diagram illustrating an IoT device 3000 according to an example embodiment. Referring to FIG. 18, the IoT device 3000 may include an IoT device application 3100 and a communication module 3200. The communication module 3200 may include a firmware 3210, a wireless baseband chipset 3230, and a security module 3240.

The IoT device application 3100 may control the communication module 3200, as a software component, and may be executed by the CPU of the IoT device. The communication module 3200 may include LAN, WLAN such as Wi-Fi, WPAN such as Bluetooth, wireless USB, Zigbee, NFC, RFID, or a wireless communication component that may be connected to or exchange data with a mobile communication network.

The firmware 3210 may provide the IoT device application 3100 and an application programming interface (API), and may control the wireless baseband chipset 3230 according to the control of the IoT device application 3100. The wireless baseband chipset 3230 may provide connectivity to a wireless communication network.

The security module 3240 may include a processor 3241 and a security chip 3242. The security module 3240 may authenticate the IoT device to access the wireless communication network and may authenticate the IoT device for access to a wireless network service. The security chip 3242 may be implemented to provide a homomorphic encrypted data transfer method as described with reference to FIGS. 1 to 15.

On the other hand, the present inventive concepts are applicable to a network system between a plurality of user terminal devices and a plurality of servers.

Figure 19:
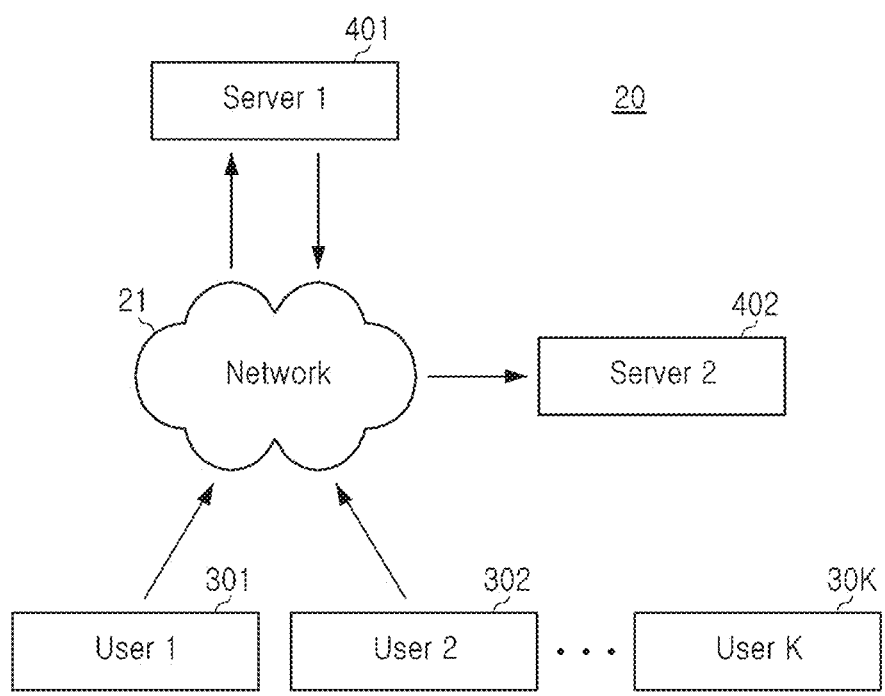
FIG. 19 is a diagram illustrating an example of a network system 20 according to an example embodiment.

FIG. 19 is a diagram illustrating an example of a network system 20 according to an example embodiment of the present inventive concepts. Referring to FIG. 19, the network system 20 includes a plurality of terminal devices 301 to 30K, where K is an integer greater than or equal to 2, and first and second servers 401 to 402, and the respective components may be connected to each other through a network 21.

The user may input various pieces of information through the terminal devices 301 to 30K. The input information may be stored in the terminal devices 301 to 30K themselves, but may be transmitted to and stored in an external device for reasons of storage capacity and security. A first server 401 may serve to store the information, and a second server 402 may serve to use a portion or all of the information stored in the first server 401.

Each of the terminal devices 301 to 30K may perform an operation based on the information provided by the first server 401 and provide the operation result to the first server 401. For example, each of the terminal devices 301 to 30K may be a party (or a user) in a distributed computing system in a multiparty computing system.

The first server 401 may store the received homomorphic ciphertext in a ciphertext state without decryption thereof. The second server 402 may request a specific processing result for the homomorphic ciphertext from the first server 401. The first server 401 may perform a specific operation according to the request of the second server 402, and then transmit the result to the second server 402. In this case, the first server 401 may perform the requested operation using the plurality of terminal devices 301 to 30K. Each of the plurality of terminal devices 301 to 30K may generate a ciphertext and parameters according to the homomorphic encrypted data transfer method as described in FIGS. 1 to 15, and may transmit the generated ciphertext and parameters to the first server 401.

When the first server 401 receives the operation result performed by each electronic device, the first server 401 may verify the received operation result through zero-knowledge proof, and may generate a result value corresponding to the requested operation, using the zero-knowledge proof-completed operation result. In addition, the first server 401 may provide the operation result to the second server 402 requesting the operation.

In an example embodiment of the present inventive concepts, a parameter for regeneration of a ciphertext is created in a table data generation technique required for an apparatus for regeneration of a ciphertext and in an apparatus thereof. Since this process creates table data in the same process as homomorphic encryption when $m=a_0 s$, information for ciphertext regeneration may be homomorphically encrypted and transmitted. Therefore, the transmitted table data has the same level of security as the homomorphic encryption of the original system, and thus, the security is not compromised by the table data.

The present inventive concepts are for a technology that may be applied when generating a ciphertext for the first time, and is a technology that may increase the 0 Level ciphertext in a state in which no operation is performed (e.g., when transmitting data) to a required level. In the existing homomorphic encryption method, an L-1 level ciphertext that is L times larger than that of a 0 level ciphertext is transmitted, but the present inventive concepts provides a technique and apparatus for sharing table data that does not affect security in advance and transmitting only the 0 level ciphertext, and a technique and apparatus for generating L-1 Level through simple operation between 0 level ciphertext and table data in example embodiments.

The homomorphic encryption device according to an example embodiment of the present inventive concepts may include a parameter generating circuit configured to generate a parameter for generation of a ciphertext having an operation level L from a ciphertext having an operation level 0. In an example embodiment, the homomorphic encryption device may include a ciphertext generation circuit configured to generate ciphertext of operation level 0 as ciphertext of operation level L, based on these parameters. In an example embodiment, the ciphertext generation circuit is configured to determine and generate a required operation level of the ciphertext, based on a calculation scenario between a plurality of ciphertexts.

A method of generating a ciphertext of a homomorphic encryption device according to an example embodiment may include: generating a parameter for generating a ciphertext having an operation level L from a ciphertext having an operation level 0; and generating the ciphertext of the operation level 0 as the ciphertext of the operation level L, based on the parameter. In an example embodiment, the method of generating a ciphertext may include determining and generating a required operation level of the ciphertext based on calculation scenario between a plurality of ciphertexts. The parameter may be generated according to the determined operation level.

As set forth above, in a storage device, a host device, and a data transfer method thereof according to an example embodiment, the amount of data transmission may be reduced and the calculation time may also be reduced by transmitting the first operation level ciphertext and parameters for ciphertext regeneration during homomorphic encrypted data transmission.

Additionally, the memory device 100, controller 200, Internet of thinks device 3000 and/or the components included therein may include processing circuitry such as hardware including logic circuits; a hardware/software combination such as a processor executing software; or a combination thereof. For example, the processing circuitry may include, but is not limited to, a central processing unit (CPU), a memory controller, an arithmetic logic unit (ALU), a digital signal processor, a microcomputer, a field programmable gate array (FPGA), and programmable logic unit, a microprocessor, application-specific integrated circuit (ASIC), etc.

While example embodiments have been illustrated and described above, it will be apparent to those skilled in the art that modifications and variations could be made without departing from the scope of the present inventive concepts as defined by the appended claims.

What is claimed is:

1. A method of transmitting data in a storage device, the method comprising:
    encrypting original data based on a homomorphic encryption algorithm to generate a first ciphertext, wherein the first ciphertext comprises a first operation level;
    generating a parameter by using the first ciphertext and a key value,
    wherein the key value is generated by performing a multiplication operation on a private key and a public key of the storage device; and
    transmitting the first ciphertext and the parameter to a ciphertext regenerator of an external host device,
    wherein the ciphertext regenerator generates one or more second ciphertexts having a second operation level, and
    wherein the second operation level of the one or more second ciphertexts is higher than the first operation level of the first ciphertext.

2. The method of claim 1, wherein the homomorphic encryption algorithm is a fully homomorphic encryption algorithm, and the first ciphertext is a ciphertext of a first operation level incapable of performing ciphertext operations multiple times.

3. The method of claim 1, wherein the encrypting comprises performing a multiplication operation on a private key of the storage device and a public key of the storage device to generate data of the multiplication operation.

4. The method of claim 3, wherein the encrypting further comprises performing an addition operation on the original data, data of the multiplication operation, and a first random value.

5. The method of claim 3, wherein the encrypting further comprises determining a magnitude of the original data.

6. The method of claim 5, wherein the encrypting further comprises shifting a first random value by bits corresponding to the determined magnitude to generate a shifted first random value.

7. The method of claim 6, wherein the encrypting further comprises performing an addition operation on the original data, data of the multiplication operation, and the shifted first random value.

8. The method of claim 1, wherein a number of public keys of the storage device corresponds to the number of operation levels of a ciphertext corresponding to the number of possible operations of the ciphertext.

9. The method of claim 1, wherein the parameter is transmitted to the host device only once, when encrypting and transmitting a plurality of original data.

10. The method of claim 9, wherein the generating of the parameter comprises, determining an operation level of the one or more second ciphertexts; and generating the parameter according to the determined operation level.

11. A storage device comprising:
    at least one non-volatile memory device; and a controller configured to control the at least one non-volatile memory device, wherein the controller includes control pins providing control signals to the at least one non-volatile memory device,
    a security module configured to perform a homomorphic encryption operation,
    a buffer memory configured to temporarily store data required for the homomorphic encryption operation, and
    at least one processor configured to control an overall operation of the controller, and wherein the security module encrypts original data into a first ciphertext of a first operation level based on a homomorphic encryption algorithm, and generates a parameter using the first ciphertext and a key value, where the first ciphertext and the parameter are used regenerate one or more second ciphertexts having a second operation level, wherein the second operation level of the one or more second ciphertexts is higher than the first operation level of the first ciphertext, and wherein the key value is generated by performing a multiplication operation on a private key and a public key of the storage device.

12. The storage device of claim 11, wherein the security module performs a Self Encryption Disk (SED) function or a Trusted Computing Group (TCG) security function.

13. The storage device of claim 11, wherein the security module determines a number of possible operations of the one or more second ciphertexts, and generates the parameter corresponding to the determined number of possible operations.

14. The storage device of claim 11, wherein the parameter is generated using a private key of the storage device and a public key of the storage device.

15. The storage device of claim 11, wherein the homomorphic encryption algorithm is one of a CKKS homomorphic algorithm and a BGV homomorphic algorithm.

16. A method of operating a host device, comprising:
receiving a first ciphertext and a parameter from a storage device, wherein the first ciphertext and the parameter having a first operation level;
regenerating, using the first ciphertext and the parameter, respective one or more second ciphertexts having a second operation level, wherein the second operation level of the one or more second ciphertexts is higher than the first operation level of the first ciphertext; and
performing a ciphertext operation using the regenerated one or more second ciphertexts.

17. The method of claim 16, further comprising selecting one of a plurality of operation levels based on the parameter.

18. The method of claim 17, wherein the regenerating of the one or more second ciphertexts includes generating a second ciphertext among the plurality of second ciphertexts corresponding to the selected operation level.

19. The method of claim 16, wherein the parameter is homomorphically encrypted and received at the same operation level as an operation level of the first ciphertext.

20. The method of claim 16, further comprising transmitting a value of the ciphertext operation to the storage device.

* * * * *